United States Patent
Kharel et al.

(10) Patent No.: US 12,306,482 B2
(45) Date of Patent: *May 20, 2025

(54) VELOCITY MATCHED ELECTRO-OPTIC DEVICES

(71) Applicant: HyperLight Corporation, Cambridge, MA (US)

(72) Inventors: Prashanta Kharel, Cambridge, MA (US); Mian Zhang, Cambridge, MA (US); Christian Reimer, Wellesley, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/652,711

(22) Filed: May 1, 2024

(65) Prior Publication Data

US 2024/0280846 A1 Aug. 22, 2024

Related U.S. Application Data

(63) Continuation of application No. 17/896,995, filed on Aug. 26, 2022, now Pat. No. 12,013,601, which is a
(Continued)

(51) Int. Cl.
*G02F 1/035* (2006.01)
*G02B 6/125* (2006.01)
(Continued)

(52) U.S. Cl.
CPC .......... *G02F 1/0356* (2013.01); *G02B 6/125* (2013.01); *G02F 1/2255* (2013.01);
(Continued)

(58) Field of Classification Search
CPC ................. G02F 1/0356; G02F 1/2255; G02F 2201/127; G02F 2202/20; G02B 6/125; G02B 2006/12142
(Continued)

(56) References Cited

U.S. PATENT DOCUMENTS

| 4,448,479 A | 5/1984 | Alferness |
| 4,553,810 A | 11/1985 | Alferness |

(Continued)

FOREIGN PATENT DOCUMENTS

| CN | 109633608 | 4/2019 |
| CN | 111736403 | 2/2022 |

(Continued)

OTHER PUBLICATIONS

Bristow et al., "Depolarization of Single Mode Channel Waveguides on Lithium Niobate", SPIE 0835, pp. 233-237 (Year: 1987).
(Continued)

*Primary Examiner* — Robert Tavlykaev
(74) *Attorney, Agent, or Firm* — Van Pelt, Yi & James LLP

(57) ABSTRACT

A velocity mismatch between optical signals and microwave electrical signals in electro-optic devices, such as modulators, may be compensated by utilizing different lengths of bends in the optical waveguides as compared to the microwave electrodes to match the velocity of the microwave signal propagating along the coplanar waveguide to the velocity of the optical signal. To ensure the electrode bends do not affect the light in the optical waveguide bends, the electrode may have to be rerouted, e.g. above or below, the optical waveguide layer. To ensure that the pair of optical waveguides have the same optical length, a waveguide crossing may be used to cross the first waveguide through the second waveguide.

17 Claims, 23 Drawing Sheets

Related U.S. Application Data continuation of application No. 16/838,763, filed on Apr. 2, 2020, now Pat. No. 11,474,384.

(51) Int. Cl.
  *G02F 1/225* (2006.01)
  *G02B 6/12* (2006.01)

(52) U.S. Cl.
  CPC .............. *G02B 2006/12142* (2013.01); *G02F 2201/127* (2013.01); *G02F 2202/20* (2013.01)

(58) Field of Classification Search
  USPC ......................................................... 385/1–3
  See application file for complete search history.

(56) References Cited

U.S. PATENT DOCUMENTS

| | | | |
|---|---|---|---|
| 4,961,619 A * | 10/1990 | Hernandez-Gil | G02F 1/3137 385/132 |
| 5,091,981 A | 2/1992 | Cunningham | |
| 5,157,756 A * | 10/1992 | Nishimoto | G02B 6/125 385/129 |
| 5,799,119 A | 8/1998 | Rolland | |
| 6,853,793 B1 | 2/2005 | van der Vliet | |
| 6,934,446 B2 * | 8/2005 | Rasras | G02B 6/125 385/39 |
| 7,155,088 B2 | 12/2006 | Thapliya | |
| 7,251,406 B2 | 7/2007 | Luo | |
| 7,333,691 B1 | 2/2008 | Gill | |
| 7,801,400 B2 | 9/2010 | Sugiyama | |
| 8,346,025 B2 | 1/2013 | Gill | |
| 8,600,198 B2 | 12/2013 | Sudo | |
| 9,036,954 B2 | 5/2015 | Kobrinsky | |
| 9,460,740 B1 | 10/2016 | Staffaroni | |
| 9,465,163 B2 | 10/2016 | Kumar | |
| 9,759,982 B2 | 9/2017 | Feng | |
| 9,778,417 B2 | 10/2017 | Cherchi | |
| 9,817,186 B2 | 11/2017 | Kamei | |
| 9,939,709 B2 | 4/2018 | Iwatsuka | |
| 10,241,273 B2 | 3/2019 | Tu | |
| 10,317,770 B2 | 6/2019 | Kono | |
| 11,181,760 B2 | 11/2021 | Zhang | |
| 2003/0068152 A1 | 4/2003 | Lawrence, III | |
| 2004/0037497 A1 | 2/2004 | Lee | |
| 2004/0151423 A1 | 8/2004 | Izhaky | |
| 2006/0210212 A1 | 9/2006 | Sugiyama | |
| 2009/0142019 A1 | 6/2009 | Popovic | |
| 2011/0081107 A1 | 4/2011 | Sugiyama | |
| 2011/0262071 A1 | 10/2011 | Mitomi | |
| 2011/0317956 A1 | 12/2011 | Sudo | |
| 2012/0027337 A1 | 2/2012 | Kondou | |
| 2015/0260916 A1 | 9/2015 | Cherchi | |
| 2015/0293427 A1 | 10/2015 | Goi | |
| 2016/0327751 A1 | 11/2016 | Wu | |
| 2017/0351025 A1 | 12/2017 | Trita | |
| 2018/0211685 A1 | 7/2018 | Mehfuz | |
| 2019/0361315 A1 | 11/2019 | Zhou | |
| 2020/0088942 A1 | 3/2020 | Bian | |
| 2020/0359116 A1 | 11/2020 | Mehrvar | |
| 2021/0080796 A1 | 3/2021 | Kissa | |
| 2021/0278597 A1 | 9/2021 | Sugiyama | |
| 2021/0325607 A1 | 10/2021 | Oka | |
| 2023/0375781 A1 | 11/2023 | Take | |

FOREIGN PATENT DOCUMENTS

| | | |
|---|---|---|
| JP | 6476876 | 3/2019 |
| WO | 2018031916 | 2/2018 |

OTHER PUBLICATIONS

Ma et al., "Ultralow loss single layer submicron silicon waveguide crossing for SOI optical interconnect." Optics Express, vol. 21, No. 24, pp. 29374-29382, Year 2013.

Sanchis et al., "Highly efficient crossing structure for silicon-on-insulator waveguides" Optics Letters/ vol. 34, No. 18, pp. 2760-2762 (Year: 2009).

Extended European Search Report for Application 20836102.2, dated Jun. 21, 2023 (Year: 2023).

Search Report from corresponding International Application No. PCT/US2020/070252, mailed Oct. 22, 2020.

\* cited by examiner

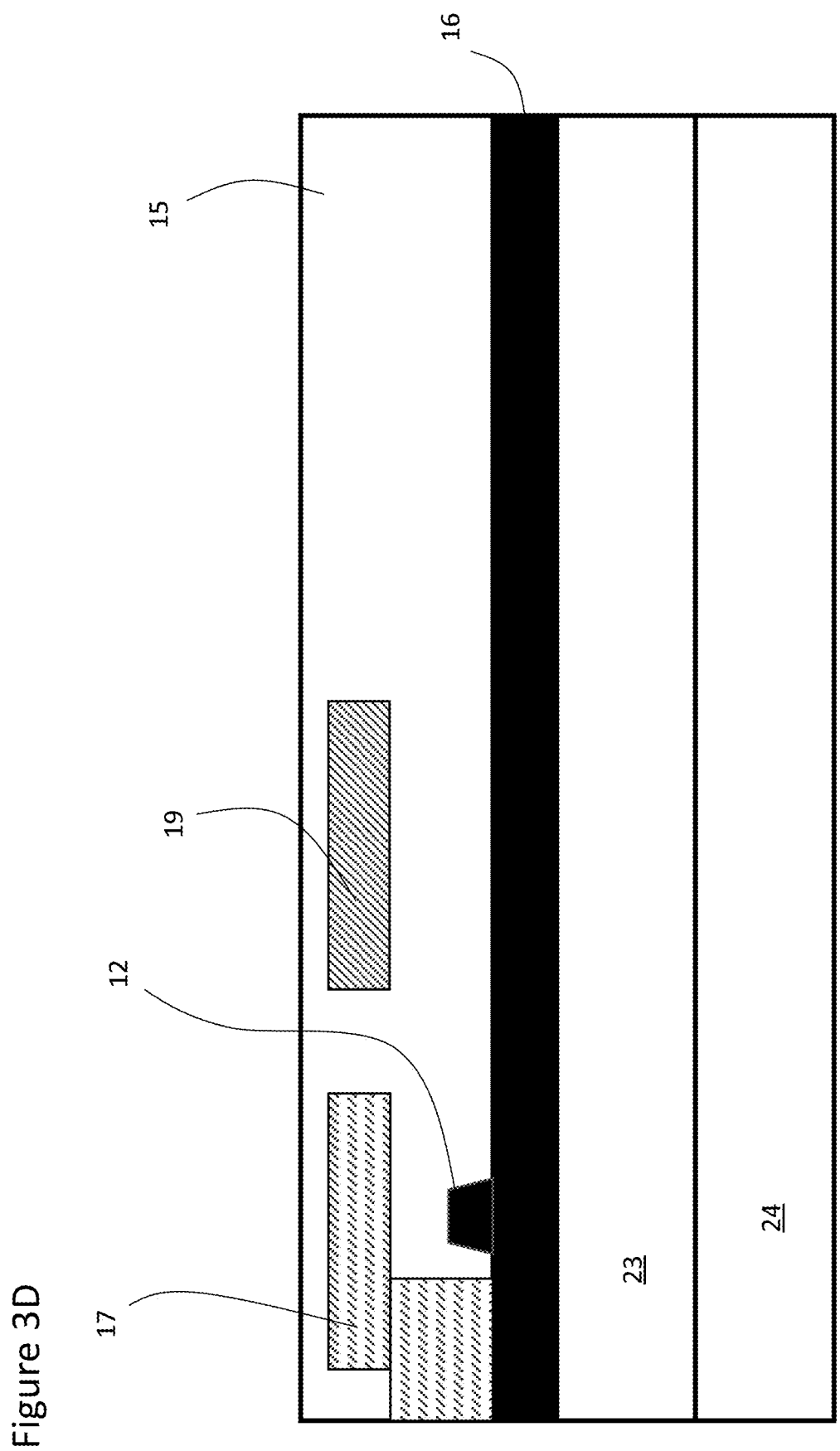

VELOCITY MATCHED ELECTRO-OPTIC DEVICES

CROSS REFERENCE TO OTHER APPLICATIONS

This application is a continuation of U.S. patent application Ser. No. 17/896,995 entitled VELOCITY MATCHED ELECTRO-OPTIC DEVICES filed Aug. 26, 2022, which is a continuation of U.S. patent application Ser. No. 16/838,763, now U.S. Pat. No. 11,474,384, entitled VELOCITY MATCHED ELECTRO-OPTIC DEVICES filed Apr. 2, 2020, all of which are incorporated herein by reference for all purposes.

TECHNICAL FIELD

The present invention relates to compensating for a mismatch between optical and microwave signals in electro-optic devices, and in particular to utilizing different lengths of bends in the optical waveguides and the microwave electrodes to match the velocity of the microwave signal propagating along the coplanar waveguide to the velocity of the optical signal.

BACKGROUND

In an effort to achieve large electro-optic bandwidths, conventional electro-optic devices attempt to match the velocity of an electrical, i.e. microwave-frequency, modulating signal propagating along a coplanar waveguide (CPW) electrode to a velocity of an optical signal propagating along waveguides in close proximity therewith. Typically, such velocity matching is achieved by: 1) changing the thickness of a lower cladding material, such as buried oxide; 2) changing the thickness of a substrate material, such as silicon; or 3) depositing an additional upper cladding, such as silicon dioxide. Changing the thickness of the cladding material or the substrate material is not ideal since it requires changing the wafer geometry. Similarly, providing an upper cladding introduces extra processing steps.

For a particular scenario in which the velocity of the optical signal is faster than the velocity of the microwave signal, one possible solution includes meandering the optical waveguides inside the, e.g. Mach-Zhender Modulator to add additional optical delay and compensate for the velocity mismatch. Such optical waveguide meandering may significantly increase the size of the device. In addition, if the microwave signal is faster than the optical signal, it is difficult to meander the microwave waveguides (CPW) to achieve velocity matching.

An object of the present invention is to overcome the shortcomings of the prior art by providing a system in which the relative lengths of bends in the electrodes and in the optical waveguides are utilized to match the velocity of the optical signal to the electrical modulating signal while a minimizing the footprint of the device.

SUMMARY OF THE INVENTION

Accordingly, the present invention relates to an electro-optic device comprising:

a first waveguide comprising a first straight waveguide section, a first bend waveguide section, and a second straight waveguide section configured to propagate a first optical signal at an optical signal velocity; and a first electrode structure comprising a first hot electrode and a first ground electrode, the first hot electrode comprising a first straight hot electrode section, a first bend hot electrode section, and a second straight hot electrode section;

wherein the first bend waveguide section comprises a first length, and the first bend hot electrode section comprises a second length, creating a difference in length, whereby the difference in length compensates for a mismatch between the first hot electrode and the first waveguide.

BRIEF DESCRIPTION OF THE DRAWINGS

The invention will be described in greater detail with reference to the accompanying drawings which represent preferred embodiments thereof, wherein:

FIG. 3D is a cross-sectional view of the device of FIG. 1 taken along line D-D;

DETAILED DESCRIPTION

Figure 1:
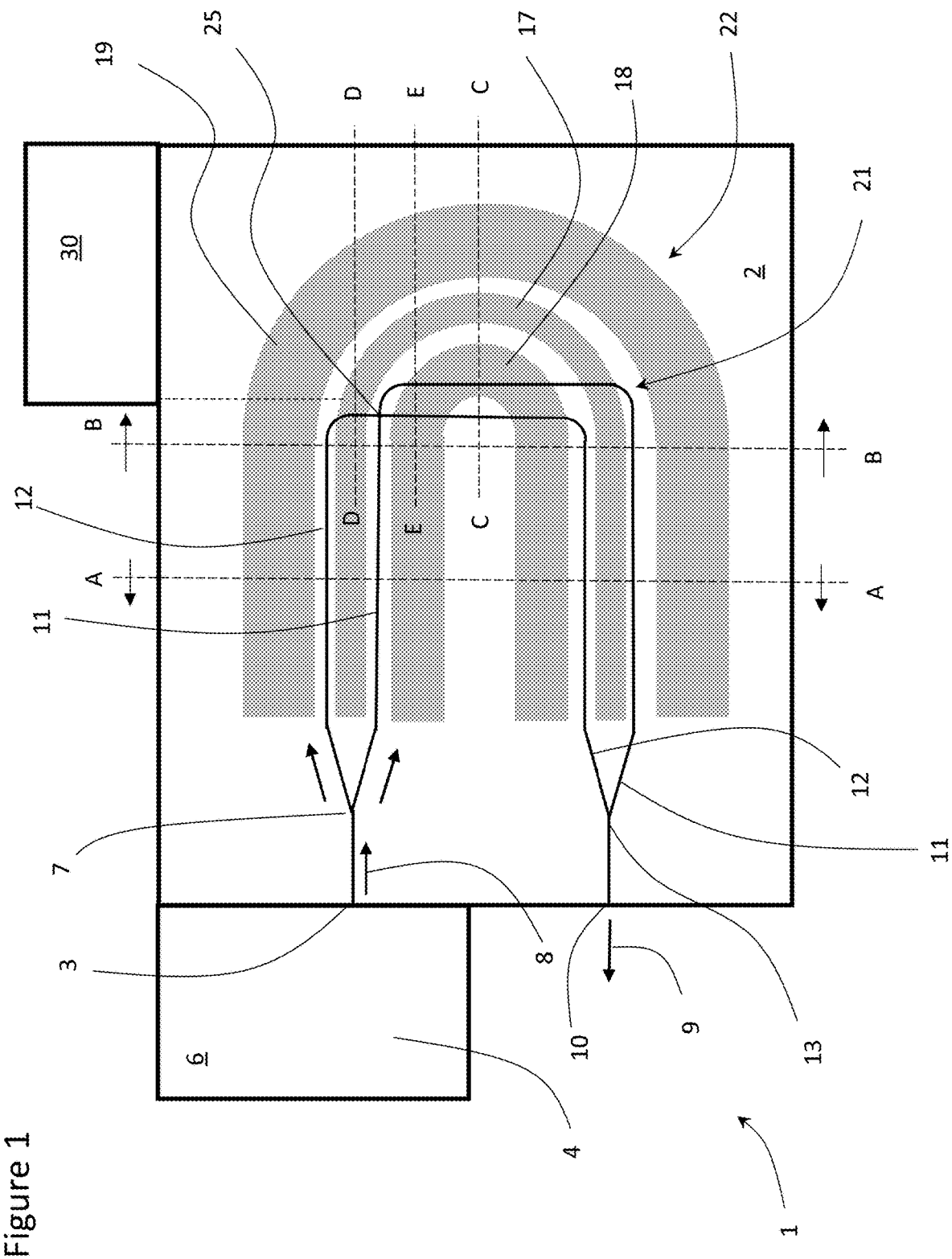
FIG. 1 is a top view of a single bend for an electro-optic device in accordance with an embodiment of the present invention in which the electrodes are longer than the optical waveguides.

While the present teachings are described in conjunction with various embodiments and examples, it is not intended that the present teachings be limited to such embodiments. On the contrary, the present teachings encompass various alternatives and equivalents, as will be appreciated by those of skill in the art.

With reference to FIGS. 1 to 4, an electro-optic device 1, e.g. a modulator such as a Mach-Zehnder modulator, may be provided on a photonic integrated circuit (PIC) chip 2. The electro-optic device 1 includes an optical input port 3, which may be optically coupled to a continuous wave light source 4, such as a laser provided on the same PIC chip 2 or on a different PIC chip 6. A first optical coupler 7, e.g. 1×2 splitter, is used to split an input beam of light 8 from the light source 4 into first and second sub-beams, which propagate along separate, spaced-apart first and second waveguides 11 and 12. A second optical coupler 13, e.g. 1×2 splitter is provided for recombining the first and second sub-beams into a modulated output beam 9 for output on output port 10. The modulated output beam 9 may undergo further processing, e.g. amplification, on the PIC chip 2 or optically coupled PICs, and then transmitted via suitable waveguides, e.g. optical fibers, to external destinations. Ideally, the first optical coupler, the first and second waveguides and the second optical coupler are comprised of electro-optical waveguide material, preferably thin-film electro-optical waveguide material, and more preferably thin-film lithium niobate waveguide material, but other types of waveguides, including non-crystalline structure or complex crystalline structure are within the scope of the invention.

Electrodes are provided for conveying an electrical, e.g. microwave-frequency, modulating signal from an external controller 30 to the first and second waveguides 11 and 12 configured for changing the index of refraction of the first and second waveguides 11 and 12, and thereby modulate the input beam of light 8 into the modulated output beam 9. In the illustrated example of FIGS. 1 to 4, which utilizes an X-cut electro-optic material for the first and second waveguides 11 and 12, a hot electrode 17 may be positioned between and parallel to the first and second waveguides 11 and 12, while a first ground electrode 18 is disposed on an opposite side of the first waveguide 11 parallel therewith, and a second ground electrode 19 is disposed on an opposite side of the second waveguide 12 parallel therewith. The first and second ground electrodes 18 and 19 may comprise other forms, e.g. the ground may be a plane that covers the entire PIC chip 2, as long as the gap between the hot electrode 17 and the ground is clear.

With particular reference to FIGS. 3A-3F, the PIC chip 2 may be comprised of a lithium niobate on insulate (LNOI) structure in which a waveguide slab layer 16, i.e. with ridge waveguides comprising the first and second waveguides 11 and 12 and the first and second couplers 7 and 13 extending therefrom, is mounted over a lower cladding layer 23, e.g. a dielectric or semiconductor oxide layer such as silicon dioxide, which is mounted over a substrate 24, such as lithium niobate, silicon, or quartz. An upper cladding layer 15, similar to the lower cladding layer 23, may be provided over the waveguide slab layer 16 and the electrodes 17-19. Buffer layers may be provided between the electrodes 17-19 and the waveguide slab layer 16.

In order to provide a means for compensating for the velocity mismatch between the optical signal and the electrical modulating signal, a first bend section 21 is introduced into each of the first and second waveguides 11 and 12 between first and second straight sections, and a second bend section 22 is introduced into the hot electrode 17 (and the first and second ground electrodes 18 and 19 if necessary), which extend parallel to each other between first and second straight sections thereof. The first bend section 21 in the first and second waveguides 11 and 12 has a different length than the second bend section 22 in the electrodes 17-19 to at least partially compensate for a mismatch, e.g. velocity mismatch, between the optical signal and the electrical modulating signal.

For a given velocity mismatch, the length of the straight segments depends on what bandwidth required for the modulator. For a refractive index mismatch of $\delta n = n_m - n_o$, where $n_m$ is the microwave index and $n_o$ is the optical group index, a 3 dB electro optic (EO) bandwidth of f is obtained if the length of the straight segment is shorter than $c/2\delta nf$. Here, c is the speed of light in vacuum. Accordingly, a modulator with a 3 dB-EO bandwidth of 100 GHz and an index difference was 0.5, then the length of the straight segment may be less than 3 mm. This formula can also be cast in terms of velocity mismatch. The length of the straight segments:

$$L \leq \frac{V_m V_o}{2(V_m - V_o) * f},$$

where $v_m$, and $v_o$ are the microwave and optical group velocities, and f is the desired 3 dB electro optic bandwidth.

Ideally, the first bend section 21 and the second bend section 22 both comprise overall resultant 180° bends, which fold the straight sections of the first and second waveguides 11 and 12, and the electrodes 17-19 back parallel to themselves, but other angles are within the scope of the invention, e.g. 90°-180°, depending on the geometry of the PIC chip 2 etc. In the illustrated examples, the first bend section 21 comprises a substantially arcuate bend for the first and second waveguides 11 and 12, and the second bend section 22 comprises an arcuate bend for each of the hot electrode 17, and the first and second ground electrodes 18 and 19, but other shapes of bends are also possible, e.g. rectangular or elliptical, for each of the first and second bend sections 21 and 22. Moreover, other bends or meandering structures are possible within the overall resultant bend, e.g. 180° bend.

Other forms of mismatch may occur when the effective modulation strength between the two arms of the electrodes 17-19 are mismatched, which leads to an effect called chirp, e.g. the first and second optical waveguides 11 and 12 do not have exactly the same length in the two gaps between the electrodes 17-19. This case may apply to MZI modulators.

This kind of mismatch may also be compensated by tailoring the relative length difference in the first and second optical waveguides 11 and 12.

With reference to FIGS. 3A to 3F, in the first and second bend sections 21 and 22 of the device of FIG. 1 (see FIGS. 3B-3E), in which the lengths of the first and second optical waveguides 11 and 12 are shorter than the length of the hot electrode 17, the hot electrode 17, the first ground electrode 18 and the second ground electrode 19 extend upwardly or downwardly from adjacent the first and second waveguides, e.g. coplanar, into a different level or layer of the upper cladding 15 or the lower cladding 23 and extend over top of or below the first and second optical waveguides 11 and 12, with a sufficiently thick, e.g. at least 500 nm, preferably greater than 800 nm, and ideally greater than um, layer of upper cladding 15 or lower cladding 23 over the first and second optical waveguides 11 and 12 to ensure that the optical mode does not experience absorption loss due to the electrodes 17 and 18, e.g. metals. Accordingly, the bend sections 21 of the first and second optical waveguides 11 and 12, e.g. which form two arms of the Mach Zehnder modulator 1, may now directly run underneath the second bend section 22 of the electrodes 17 and 18. After the second bend section 22, the electrodes 17 and 18 extend back down or up to the same layer, i.e. coplanar, as the first and second waveguides 11 and 12, for the second straight section, with the first and second waveguides 11 and 12 extending therebetween in interposed but opposite positions, e.g. the first waveguide 11 between the hot electrode 17 and the second ground electrode 19, and the second waveguide 12 between the hot electrode 17 and the first ground electrode 18. Accordingly, the direction of the electric field, which extends from hot electrode 17 to the ground electrodes 18 and 19 is always in the same direction relative to an optical axis, e.g. extraordinary axis of the electro-optic crystal (+Z axis for LN), of the first and second waveguides 11 and 12 even when the first and second waveguides 11 and 12 flips direction. If the direction of the E-field is not kept the same, then all the electro-optic phase shift accumulated before the first bend section 21 will be cancelled after the first bend section 21, resulting in no modulation of the optical signal. If the first and second waveguides 11 and 12 don't extend into a position in which they would contact the first ground electrode 18 or the second ground electrode 18, the first ground electrode 18 or the second ground electrode 19 may remain in their original position, e.g. adjacent to the first and/or second waveguides 11 and 12.

In the illustrated embodiments, the electrodes 16, 17 and 18 in the straight region may be on the same plane, i.e. coplanar, as ridges of the first and second optical waveguide 11 and 12; however, the electrodes 16, 17 and 18, may not necessarily be coplanar with ridges of the first and second optical waveguide 11 and 12. For example, the electrodes 16, 17 and 18 may extend slightly above the waveguide layer 16, slightly into the waveguide layer 16 or even through the waveguide layer 16 into the lower cladding layer 23. Ideally, so the electrodes 16, 17 and 18 are adjacent to the first and second optical waveguides 11 and 12. An etching step may be performed to etch through the waveguide layer 16, e.g. the lithium niobate thin film, and/or even through the lower cladding layer 23.

Figure 2:
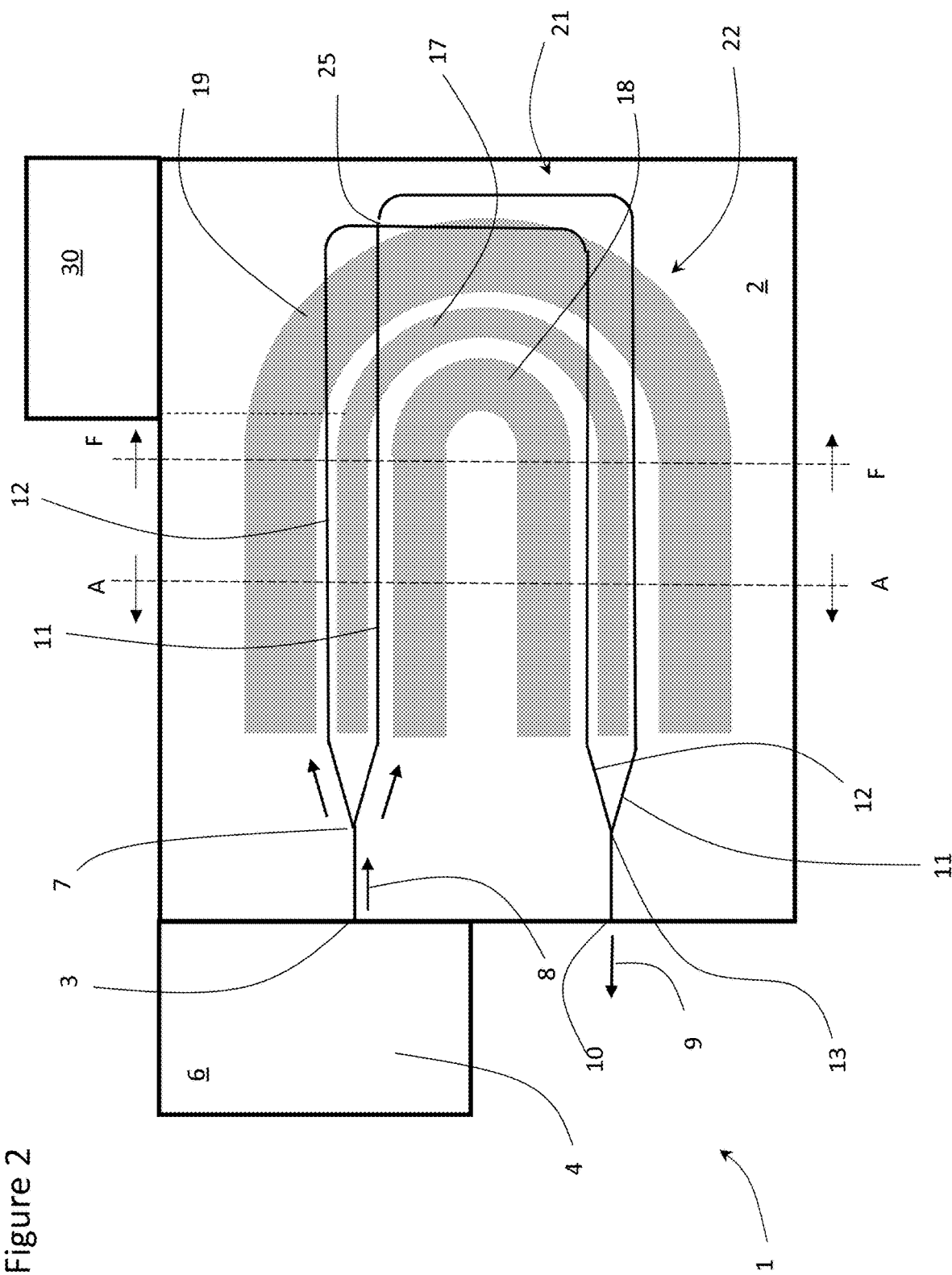
FIG. 2 is a top view of a single bend for an electro-optic device in accordance with another embodiment of the present invention in which the electrodes are shorter than the optical waveguides.
Figure 3A:
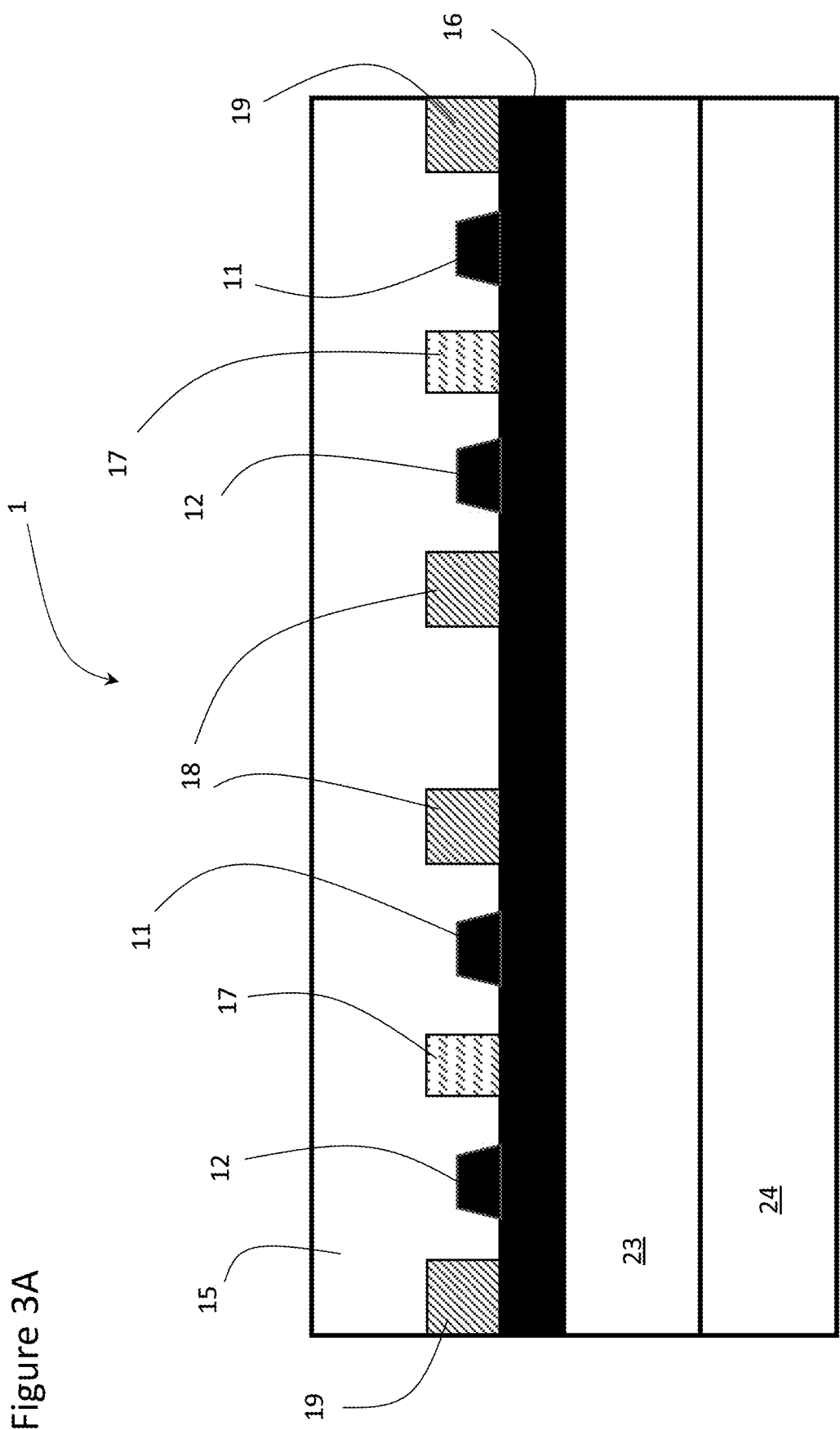
FIG. 3A is a cross-sectional view of the device of FIGS. 1 and 2 taken along line A-A looking left.
Figure 3B:
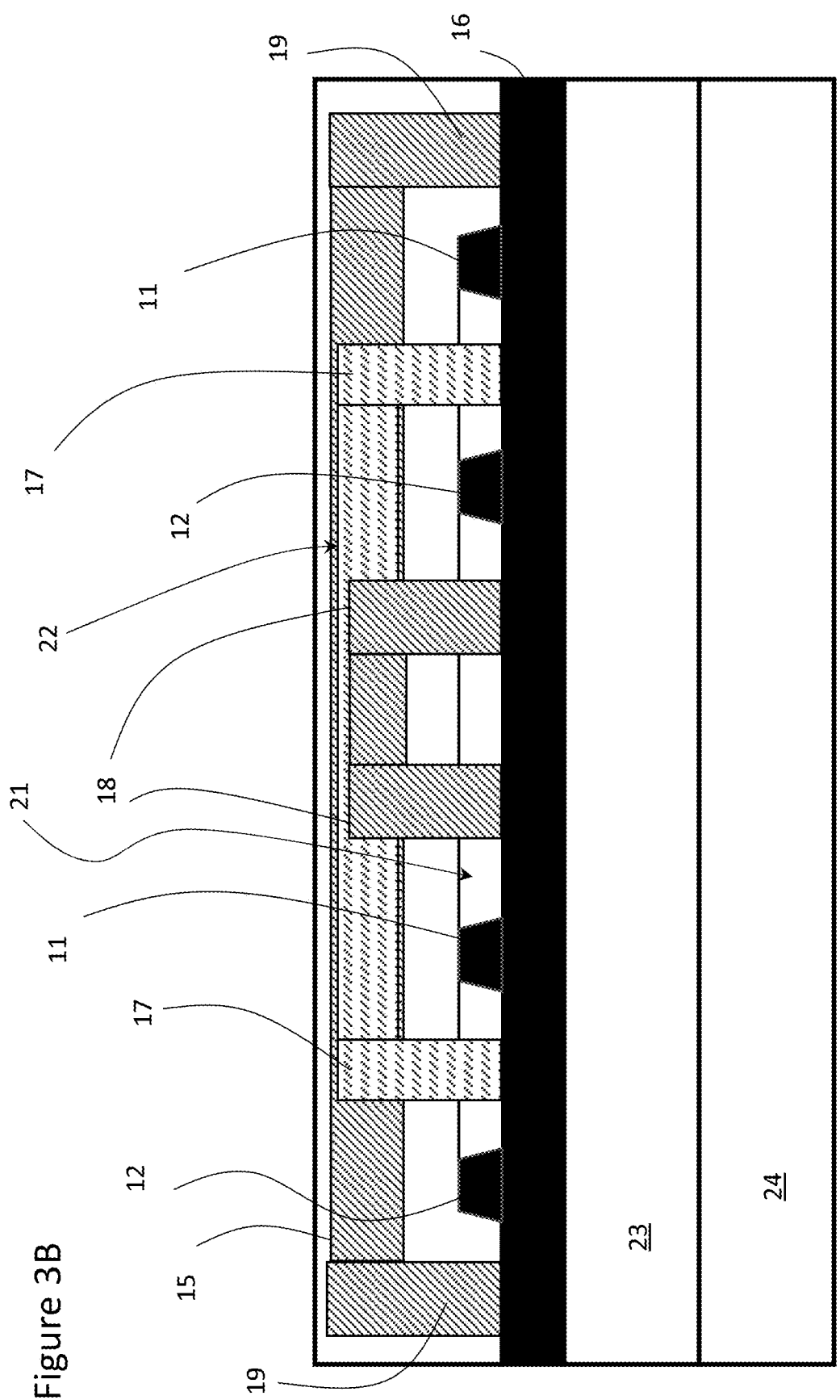
FIG. 3B is a cross-sectional view of the device of FIG. 1 taken along line B-B looking right with cladding removed.
Figure 3C:
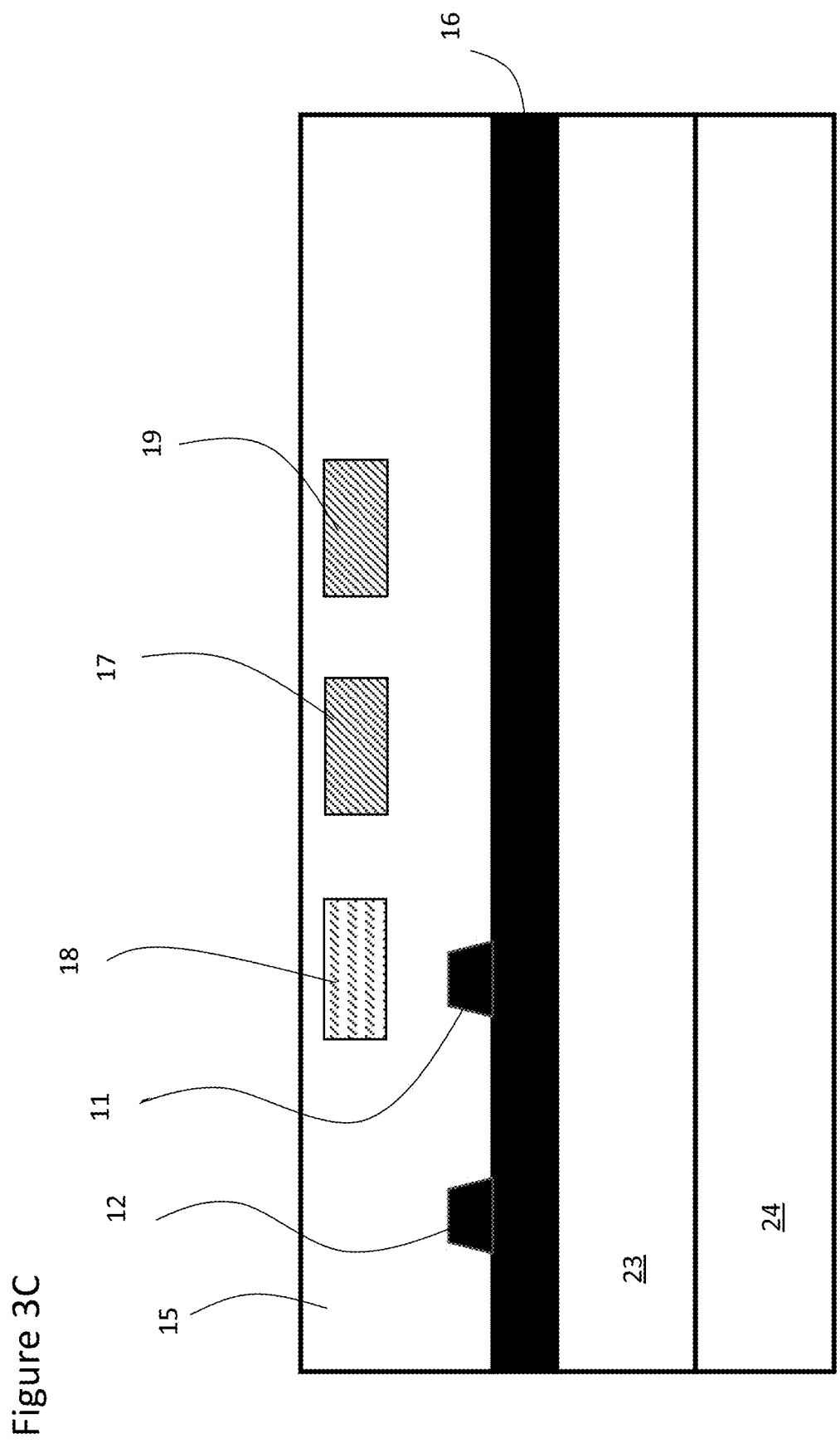
FIG. 3C is a cross-sectional view of the device of FIG. 1 taken along line C-C.
Figure 3E:
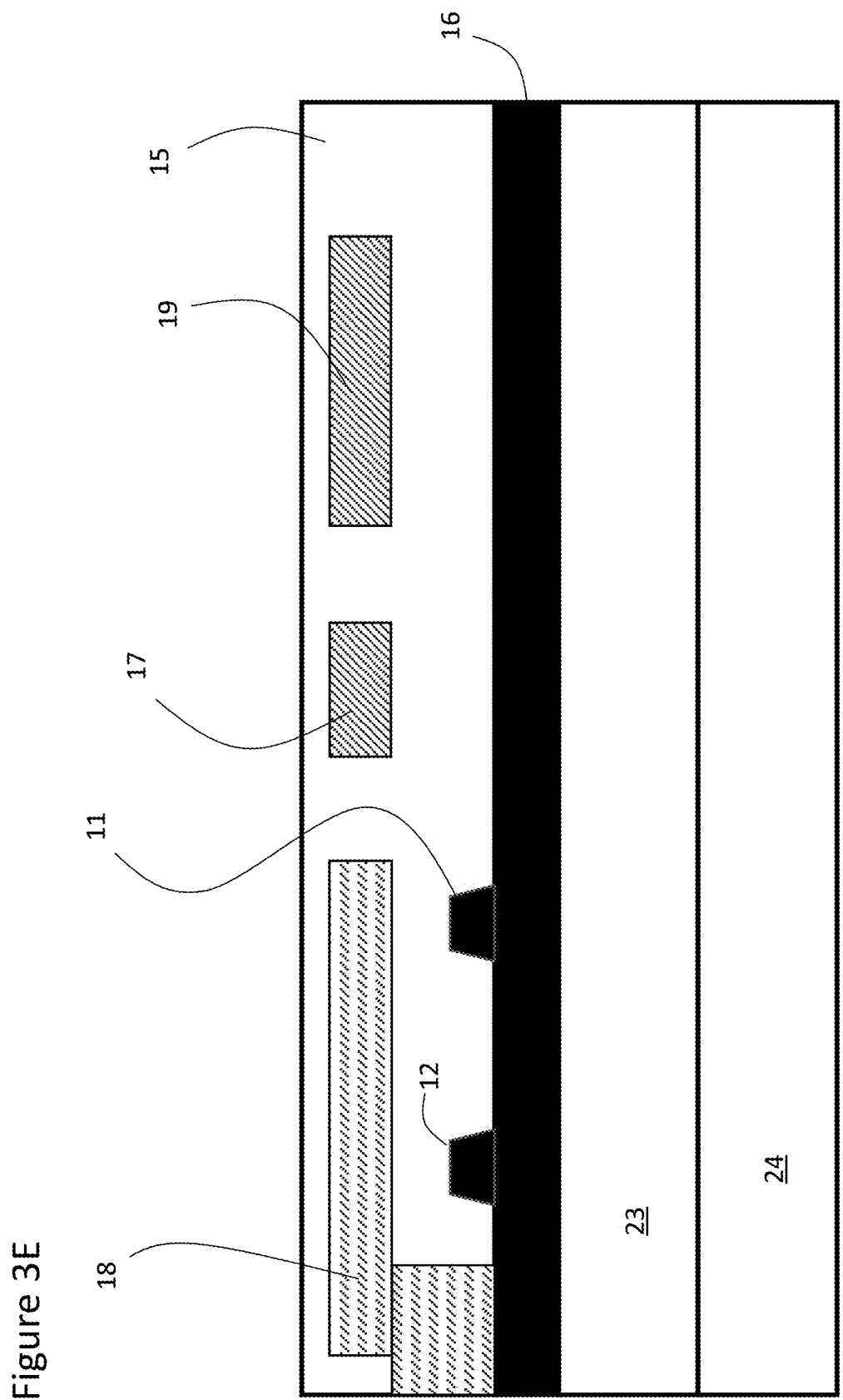
FIG. 3E is a cross-sectional view of the device of FIG. 1 taken along line E-E.
Figure 3F:
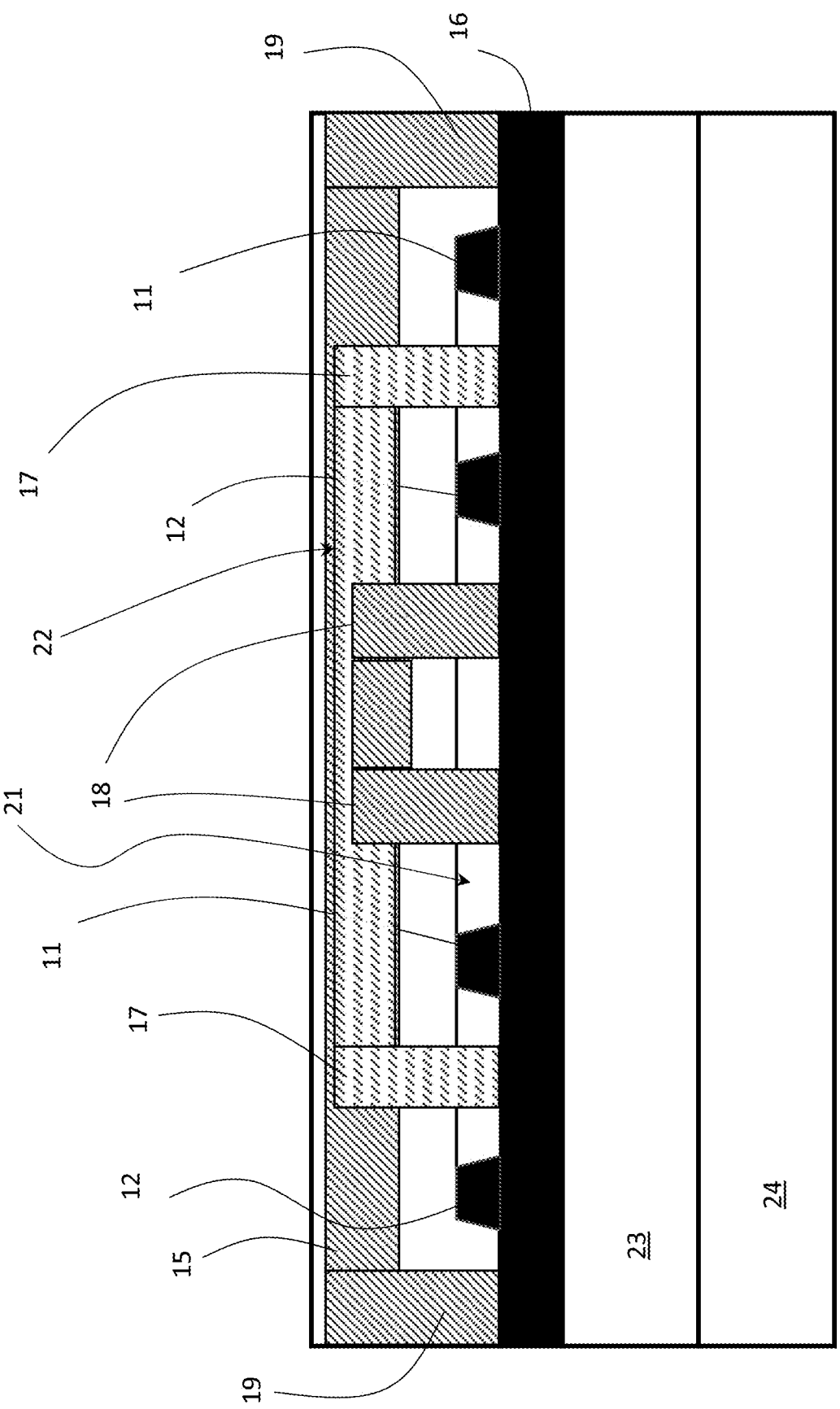
FIG. 3F is a cross-sectional view of the device of FIG. 2 taken along line F-F looking right with the cladding removed.

With reference to FIG. 3F, in the first and second bend sections 21 and 22 of the device of FIG. 2, in which the lengths of the first and second optical waveguides 11 and 12 are longer than the length of the hot electrode 17, the hot electrode 17, the second ground electrode 19 and the first ground electrode 18 extend upwardly from being coplanar with the first and second waveguides 11 and 12 into a different level or layer of the upper cladding 15 and extend over top of the first and second waveguides 11 and 12, with a sufficiently thick (>1 um) layer of upper cladding 15 over the first and second optical waveguides 11 and 12 to ensure that the optical mode does not experience absorption loss due to the electrodes 17, 18 and 19, e.g. metals. Accordingly, the first bend sections 21 of the first and second waveguides 11 and 12, e.g. which form two arms of the Mach Zehnder modulator 1, may now directly run underneath the second bend sections 22 of the electrodes 17, 18 and 19. After the second bend section 22, the electrodes 17, 18 and 19 extend back down to the same layer as, i.e. coplanar with, the first and second waveguides 11 and 12, for the second straight section, with the first and second waveguides 11 and 12 extending therebetween in interposed but opposite positions, e.g. the first waveguide 11 between the hot electrode 17 and the second ground electrode 19, and the second waveguide 12 between the hot electrode 17 and the first ground electrode 18. Accordingly, the direction of the electric field, which extends from hot electrode 17 to the ground electrodes 18 and 19 is always in the same direction relative to an optical axis, e.g. extraordinary axis of the electro-optic crystal (+Z axis for LN), of the first and second waveguides 11 and 12 even when the first and second waveguides 11 and 12 flips direction. If the direction of the E-field is not kept the same, then all the electro-optic phase shift accumulated before the first bend section 21 will be cancelled after the first bend section 21, resulting in no modulation of the optical signal.

Figure 4A:
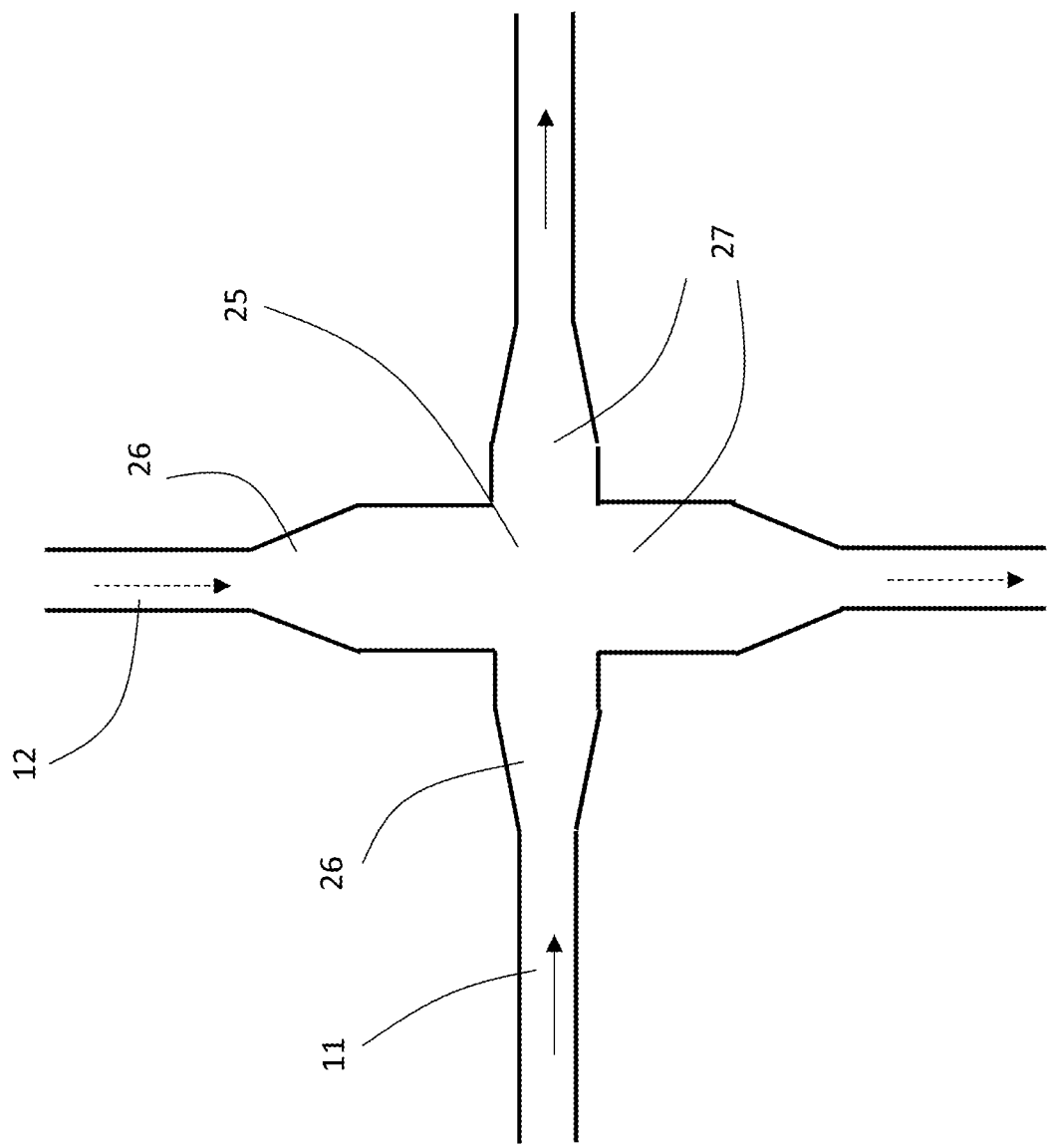
FIG. 4A is a top view of a waveguide crossing for the device of FIGS. 1 and 2.

The first and second optical waveguides 11 and 12 may cross each other, e.g. at 90° angle, at an intersection formed by a crossing 25 in the second bend section 22, which enables the first and second optical waveguides 11 and 12 to enter appropriate sections between the electrodes 17-19, which have become coplanar again in the second straight section, so that correct electro-optical phase shift may be accumulated on both the first and second waveguides 11 and 12 of the Mach-Zehnder modulator 1 after the first and second waveguides 11 and 12 reverse direction. The waveguide crossing 25 may be designed to have <0.1 dB insertion loss and <50 dB of cross talk between the first and second optical waveguides 11 and 12 of the modulator 1. With reference to FIG. 4, the crossing 25 may comprise expanding sections 26 for expanding the modes of the input sub-beams from the first and second optical waveguides 11 and 12, and tapering sections 27 for narrowing the mode of the input sub-beams re-entering the first and second waveguides 11 and 12. Ideally, the expansion and corresponding tapering is on the order of 2× to 4×, ideally 3×. The crossing 25 also includes intersecting wider straight sections 28 after the expanding sections 26 and before the tapering sections 27, whereby the first and second optical waveguides 11 and 12 are perpendicular when they cross. The straight sections 28 for the first optical waveguide 11, i.e. a first crossing length, may be longer or shorter, e.g. 1.2× to 4×, than for the second optical waveguide 12, i.e. a second crossing length. The width of the expanding sections 26 and the tapering sections 27, the lengths of the expanding sections 26 and the tapering sections 27, and the length of the first and second crossing lengths may be changed to minimize insertion loss as well as minimize cross talk between the first and second optical waveguides 11 and 12.

Figure 4B:
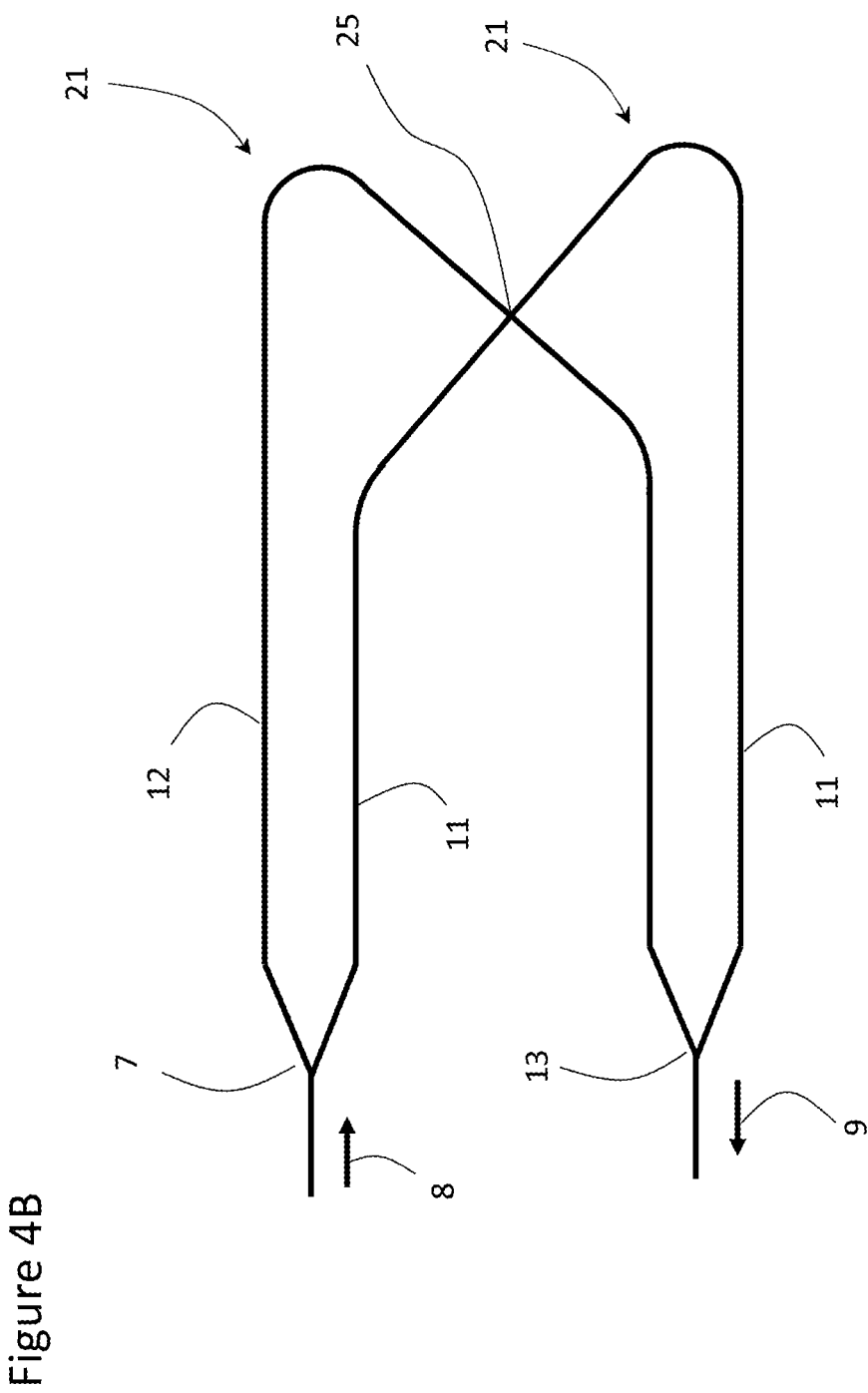
FIG. 4B is a top view of an alternative waveguide arrangement for the device of FIGS. 1 and 2.

Note that the optical path lengths of the first and second waveguides 11 and 12 may ideally be equalized in the first bend section 21 before entering the second straight section of the first and second waveguides 11 and 12. For example, in FIG. 1, for the sake of simplicity, the first optical waveguide 11 and the second optical waveguide 12 appear to have the same bend radius in the bend section 21, whereby the first optical waveguide appears longer than the second optical waveguide 12. However, to equalize the optical path lengths between the first and second optical waveguides 11 and 12, the bend radius of the bend section 21 of the first optical waveguide 11 may be different than the bend radius of the bend section 21 of the second optical waveguide 12. Accordingly, the lengths of the waveguides in the bend section 21 may be provided to ensure the total lengths of the first and second optical waveguides 11 and 12 are the same. In addition, meandering of one of the first and second optical waveguides 11 and 12 in the first bend section 21 may be provided to add extra length to match the optical lengths of the two optical waveguides. Alternatively or in addition, as illustrated in FIG. 4B, the crossing 25 may be provided in the first and second optical waveguides 11 and 12 in an X configuration, whereby each of the first and second optical waveguides 11 and 12 includes a long section and a short section, substantially parallel to each other, and a diagonal section in the first bend section 21 interconnecting the long section and the short section. The short section of the first optical waveguide 11 and the long section of the second optical waveguide 12 extending from the first optical coupler 7, and the long section of the first optical waveguide 11 and the short section of the second optical waveguide 12 extend from the second optical coupler 13. The diagonal section of the first optical waveguide 11 crosses the diagonal section of the second optical waveguide 12, which may be perpendicular to each other, at the crossing 25.

Moreover, the delay introduced in the first bend section 21 may over compensate for any mismatch in the first straight sections of the waveguides 11 and 12 and the electrodes 17-19 and introduce an overcompensation, which will then compensate for the mismatch introduced by the second straight sections of the waveguides 11 and 12 and the electrodes 17-19.

With reference to FIGS. 1 and 2, by changing the optical path length, i.e. length of the first bend section 21, to be shorter (FIG. 1) or longer (FIG. 2) than the effective path length for the microwave electrical modulating signal, i.e. the length of the second bend section 22, the velocity mismatch between the optical signal and the microwave electrical modulating signal may be compensated regardless of whether the optical or microwave velocity is faster. Accordingly, by adjusting the relative lengths of the first and second bend sections 21 and 22, e.g. by lengthening or shortening the first and second waveguides 11 and 12 to comprise longer or shorter lengths than the electrodes 17-19, any desired amount of compensation for the velocity mismatch may be incorporated, without changing the wafer geometry, changing the substrate materials, or depositing extra cladding materials.

With particular reference to FIGS. 3A and 3B, the PIC chip 2 may be comprised of a lithium niobate on insulator (LNOI) structure in which a waveguide layer 16, i.e. comprising the first and second waveguides 11 and 12 and the first and second couplers 7 and 13, is mounted over a lower cladding layer 23, e.g. a dielectric or semiconductor oxide layer such as silicon dioxide, which is mounted over a substrate 24, such as lithium niobate or silicon. An upper cladding layer 15, similar to the lower cladding layer 23, may be provided over the waveguide layer and the electrodes 17-19. Buffer layers may be provided between the electrodes 17-19 and the waveguide layer 16.

Figure 5A:
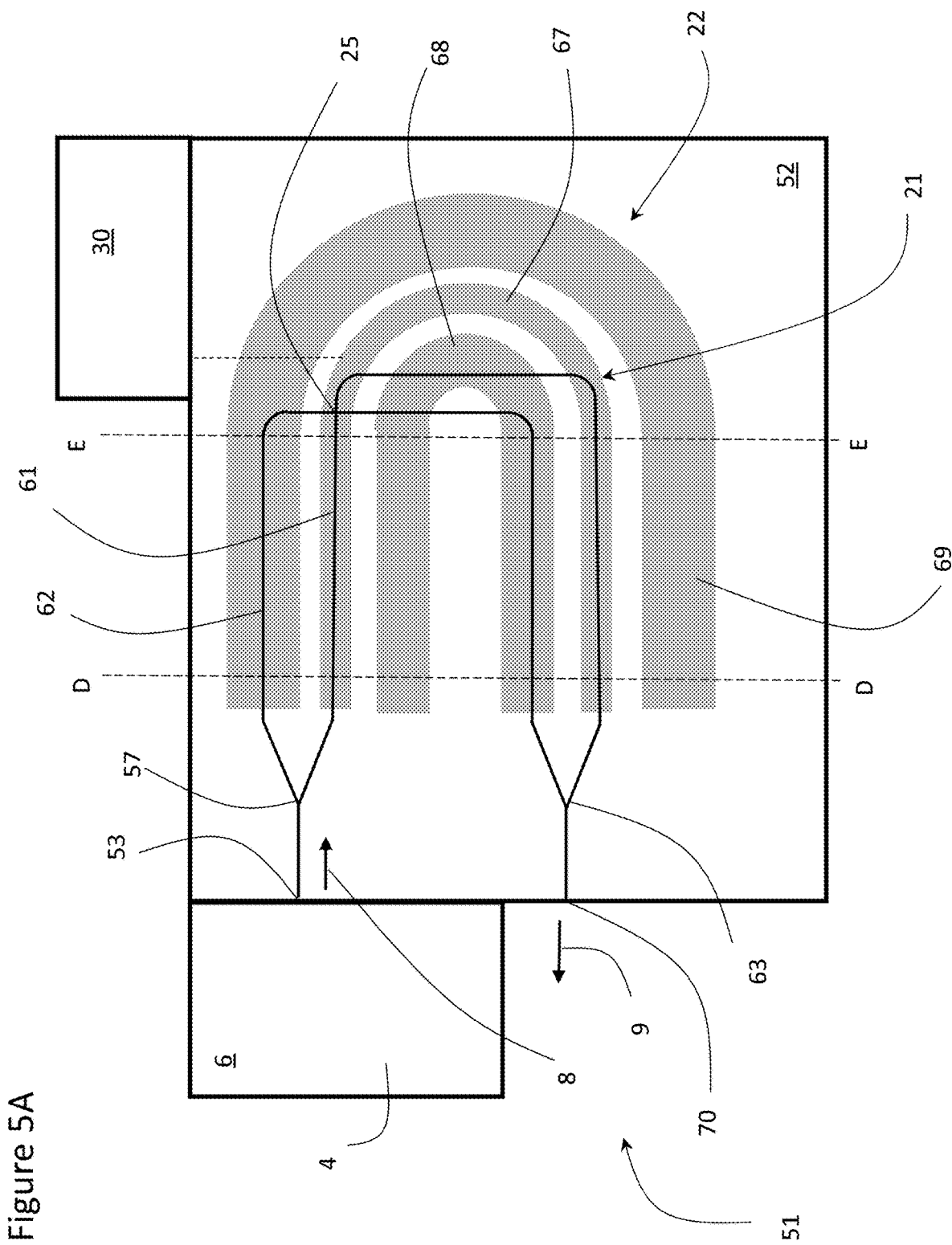
FIG. 5A is a top view of a single bend for a Z-axis electro-optic device in accordance with another embodiment of the present invention.
Figure 5B:
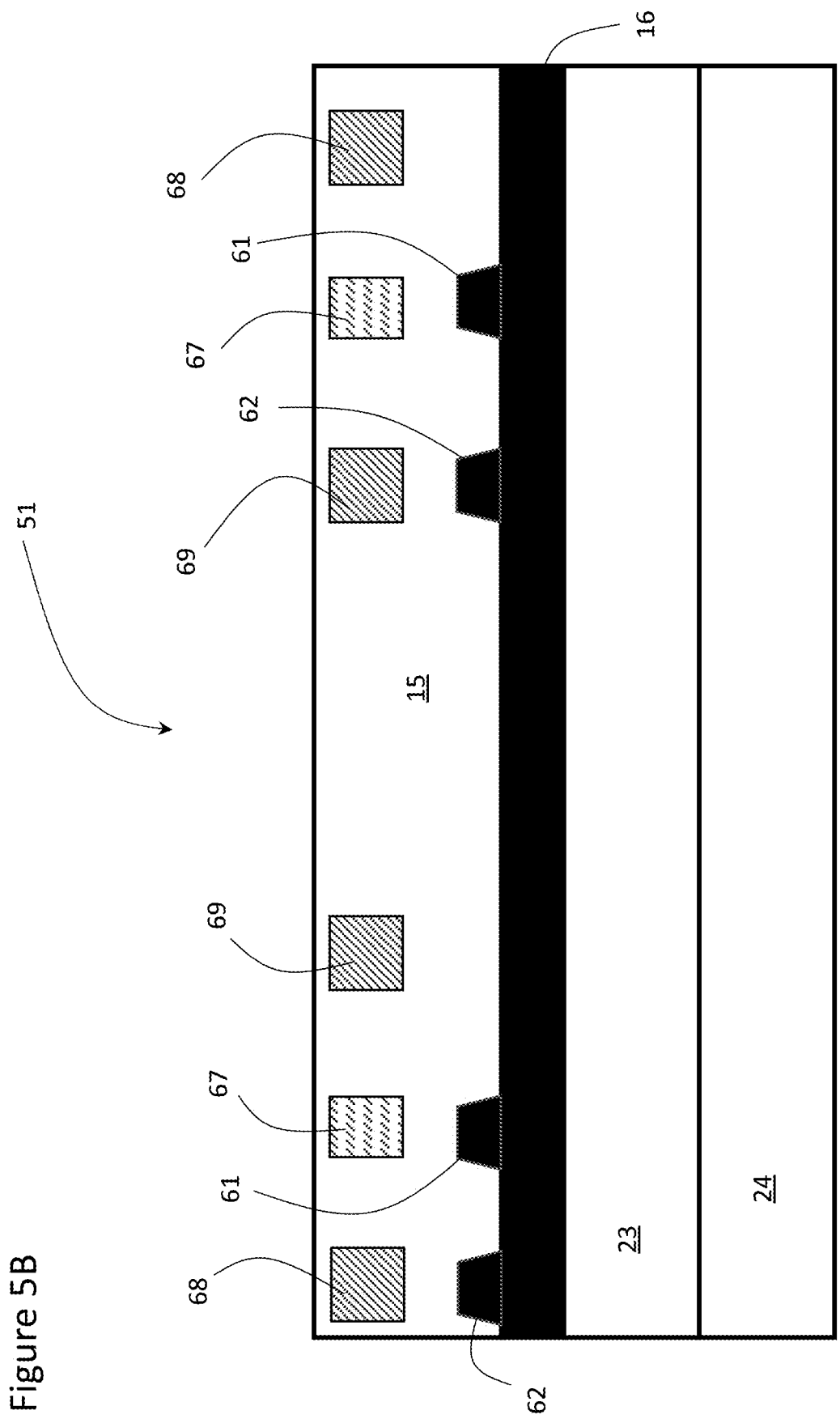
FIG. 5B is a cross-sectional view of the device of FIG. 5A taken along line D-D looking right.
Figure 5C:
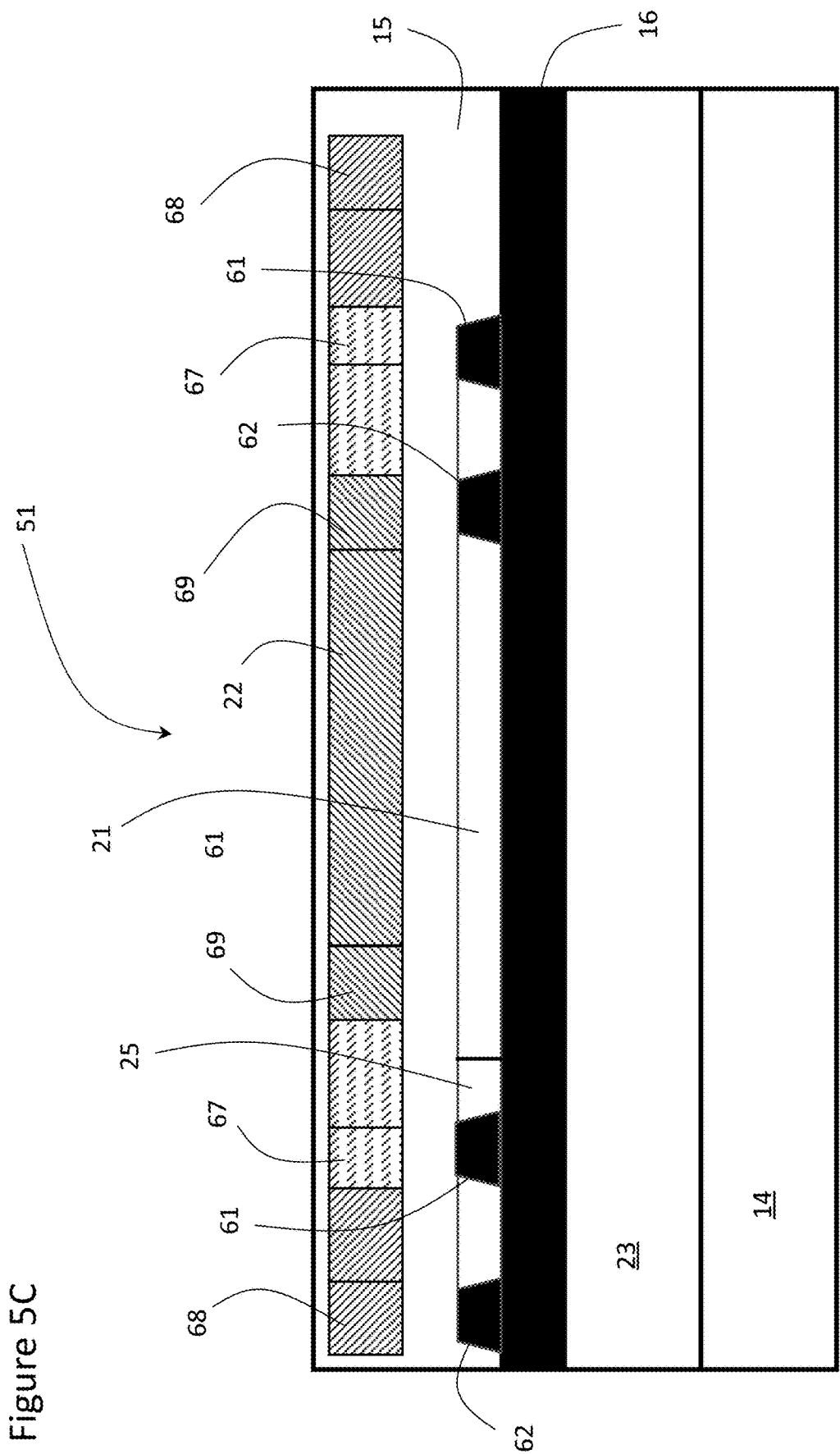
FIG. 5C is a cross-sectional view of the device of FIG. 5A taken along line E-E looking left with the cladding removed.

With reference to FIGS. 5A, 5B and 5C, an electro-optic device 51, e.g. a modulator such as a Mach-Zehnder modulator, may be provided on a photonic integrated circuit (PIC) chip 52, comprises an optical input port 53, which may be optically coupled to a continuous wave light source 4, such as a laser provided on the same PIC chip 52 or on a different PIC chip 6. A first optical coupler 57, e.g. 1×2 splitter, is used to split an input beam of light 8 from the light source 4 into first and second sub-beams, which propagate along separate, spaced-apart first and second waveguides 61 and 62. A second optical coupler 63, e.g. 1×2 splitter, is provided for recombining the first and second sub-beams into a modulated output beam 69 for output an output port 70. The modulated output beam 69 may undergo further processing, e.g. amplification, on the PIC 52 or optically coupled PICs, and then transmitted via suitable waveguides, e.g. optical fibers, to external destinations. Ideally, the first optical coupler 57, the first and second waveguides 61 and 62 and the second optical coupler 63 are comprised of thin-film waveguides, and in particular thin-film lithium niobate waveguides, but other types of waveguides are within the scope of the invention.

Electrodes are provided for conveying an electrical, e.g. microwave-frequency, modulating signal from an external controller 30 to the first and second waveguides 61 and 62 configured for changing the index of refraction of the first and second waveguides 61 and 62, and thereby modulate the input beam of light 8 into the modulated output beam 9. In the example of FIGS. 5A, 5B and 5C, the electro-optic device 51, e.g. modulator, may comprise a Z-cut electro-optic material for the first and second waveguides 61 and 62, a hot electrode 67 may be positioned above and parallel to the first waveguide 61 (or the second waveguide 62), while a first ground electrode 68 is disposed above the second waveguide 62 (or the first waveguide 61) parallel therewith in the top straight section, and disposed above and parallel to a second ground electrode 69 in the bottom straight section. The first and second ground electrodes 68 and 69 may comprise other forms, e.g. the ground may be a plane that covers the entire PIC chip 52, as long as the gap between the hot electrode 67 and the ground is clear.

For the Z-cut embodiment, the first bend section 21 need not require the electrodes 67-69 to extend up to a different level as the first and second waveguides 61 and 62, and then back down, since the electrodes 67-69 are already at a different level in a different layer of the upper cladding 15 than the first and second waveguides 61 and 62, as seen in FIGS. 6 and 7. However, the remaining elements and features of the device 51, in particular the differences in length of the first and second bend sections 21 and 22, are similar to those described with reference to the device 1 in FIGS. 1 to 4.

Figure 6A:
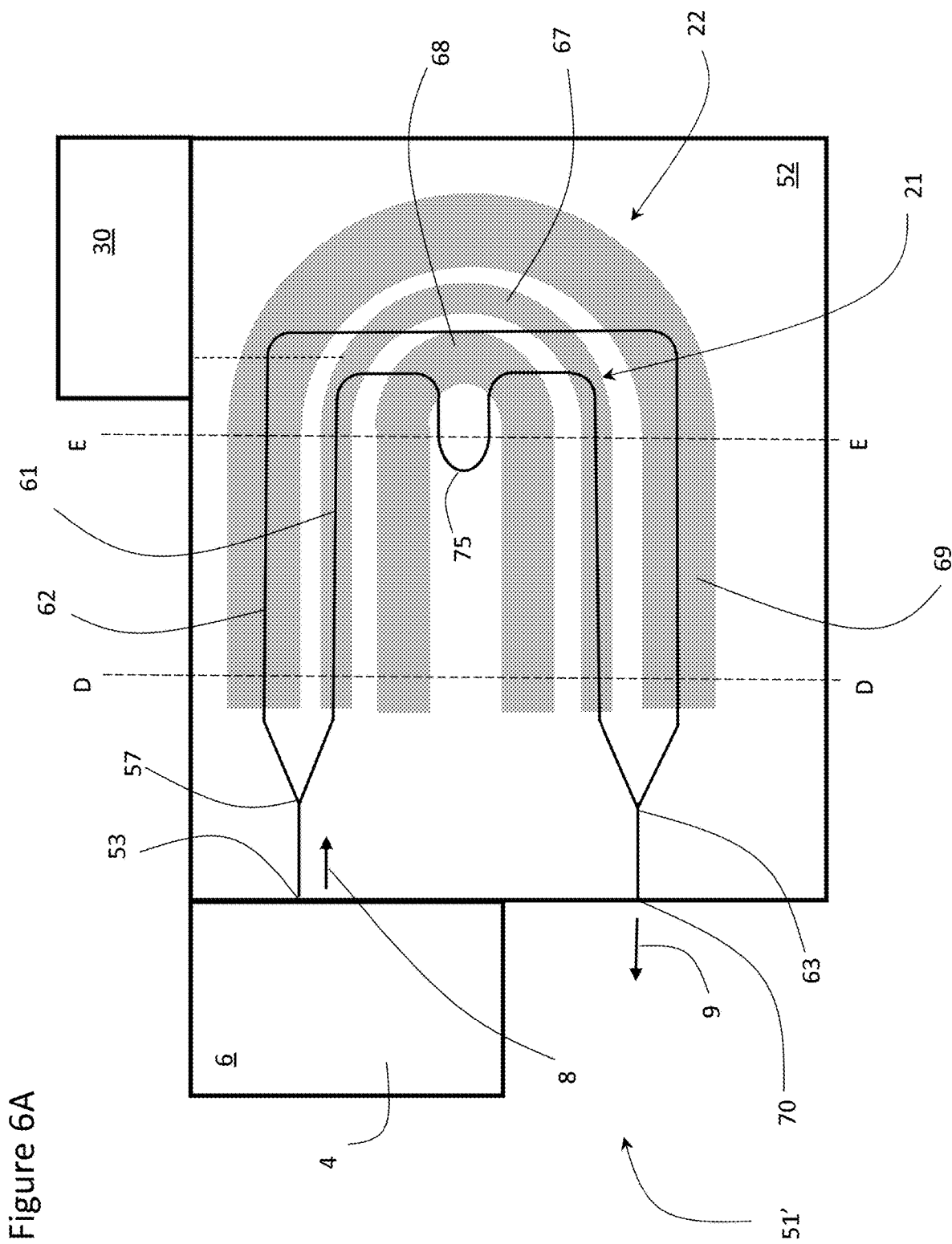
FIG. 6A is a top view of a single bend for a Z-axis electro-optic device in accordance with another embodiment of the present invention.
Figure 6B:
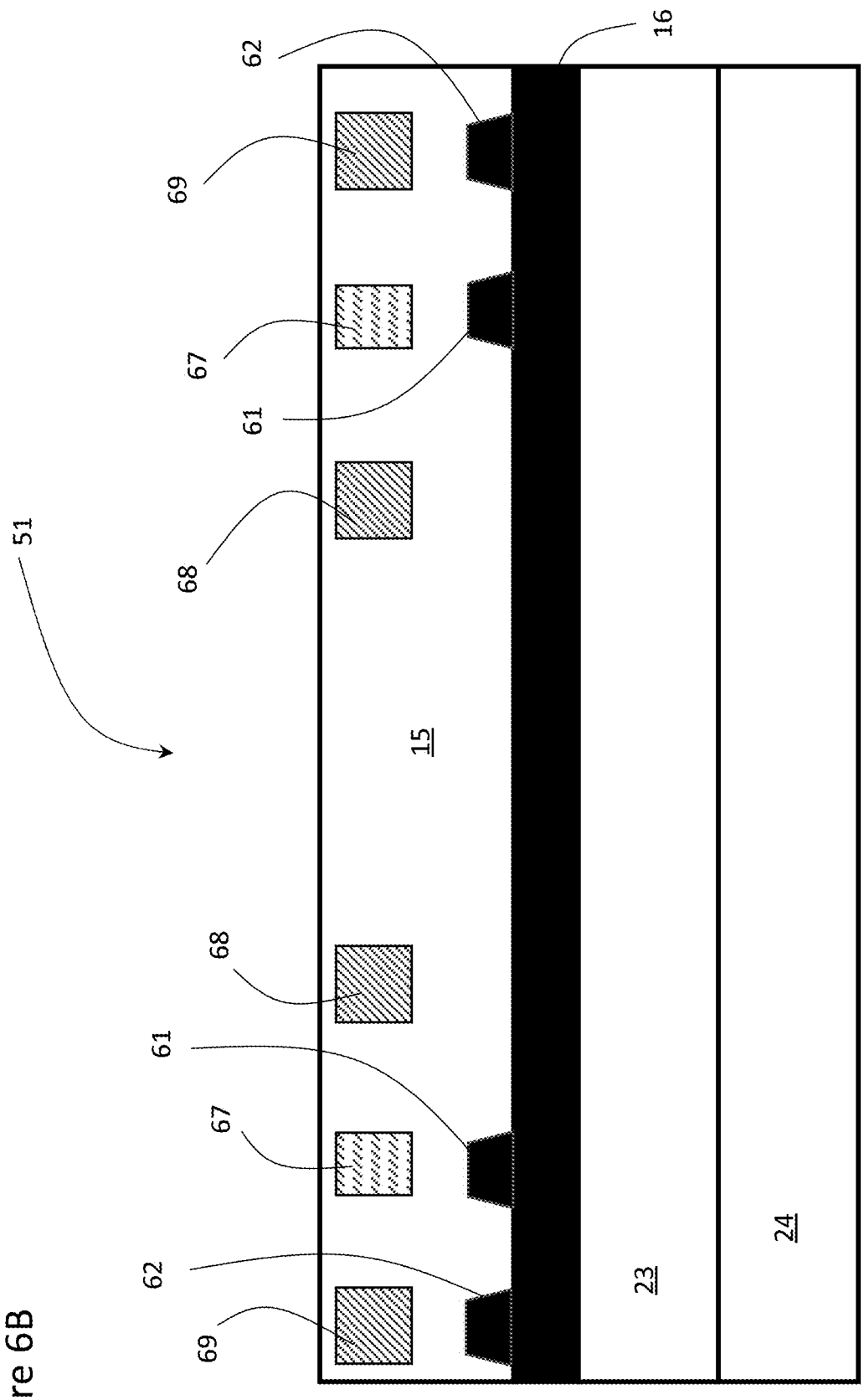
FIG. 6B is a cross-sectional view of the device of FIG. 5 taken along line D-D looking left.
Figure 6C:
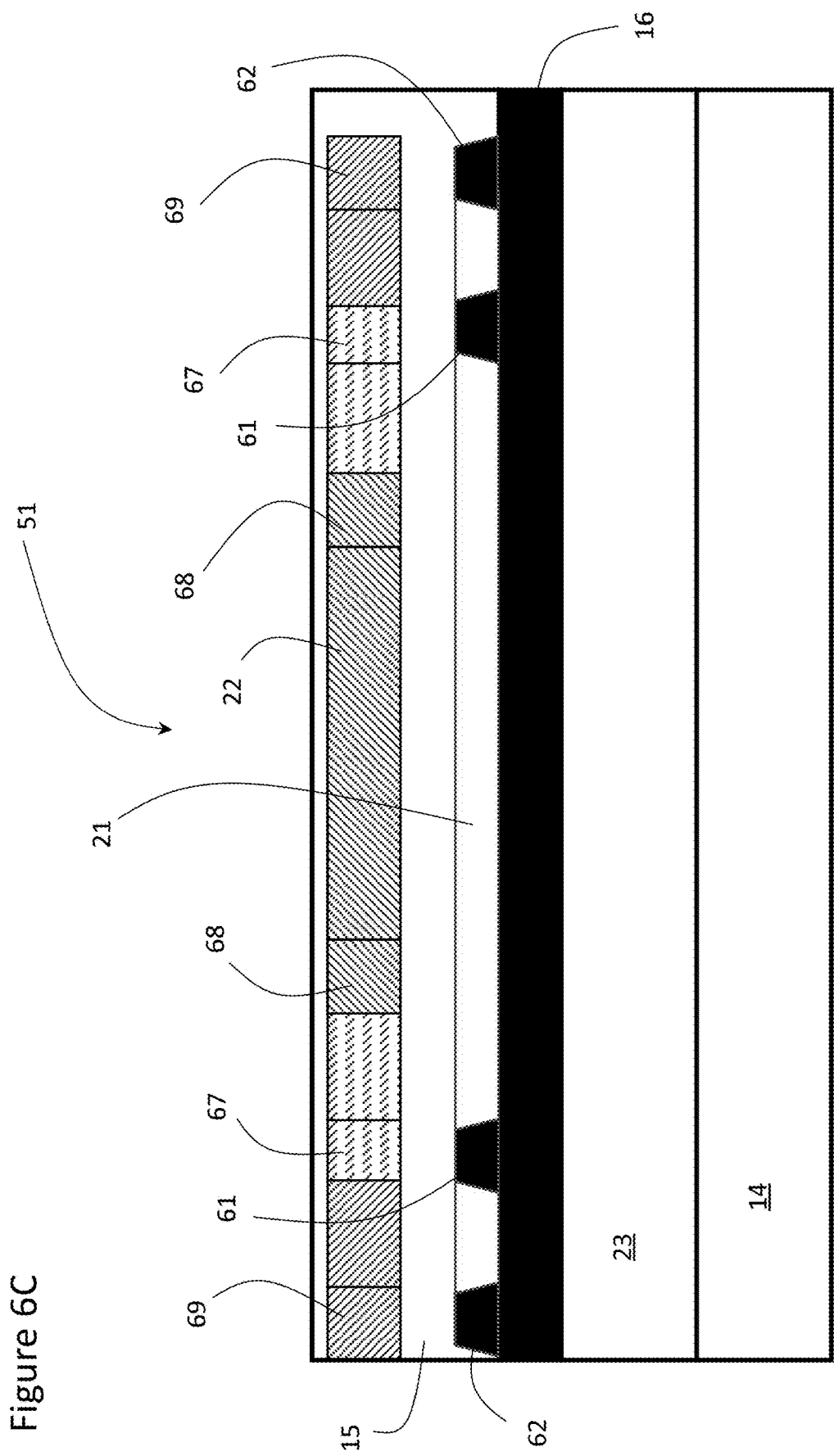
FIG. 6C is a cross-sectional view of the device of FIG. 5 taken along line E-E looking right with the cladding removed.

With reference to FIGS. 6A, 6B and 6C, an alternate embodiment of a Z-cut electro-optic device 51' comprises the same elements as the Z-cut electro-optic device 51 except that the second waveguide 62 does not need to cross the first waveguide 61, because the first bend section 21 in the second waveguide 62 includes a bend radius larger than the first bend section 21 in the first waveguide 61, whereby the second straight section of the second waveguide 62 is back underneath the second straight section of the first ground electrode 68 after the second bend section 22. The first waveguide 61 extends under the hot electrode 67 for both the first and second straight waveguide sections on either side of the first bend section 21. A meandering structure 75, e.g. U-shaped bend, may be provided in the first waveguide 61 to equalize the optical path length of both the first and second waveguides 61 and 62.

Figure 7A:
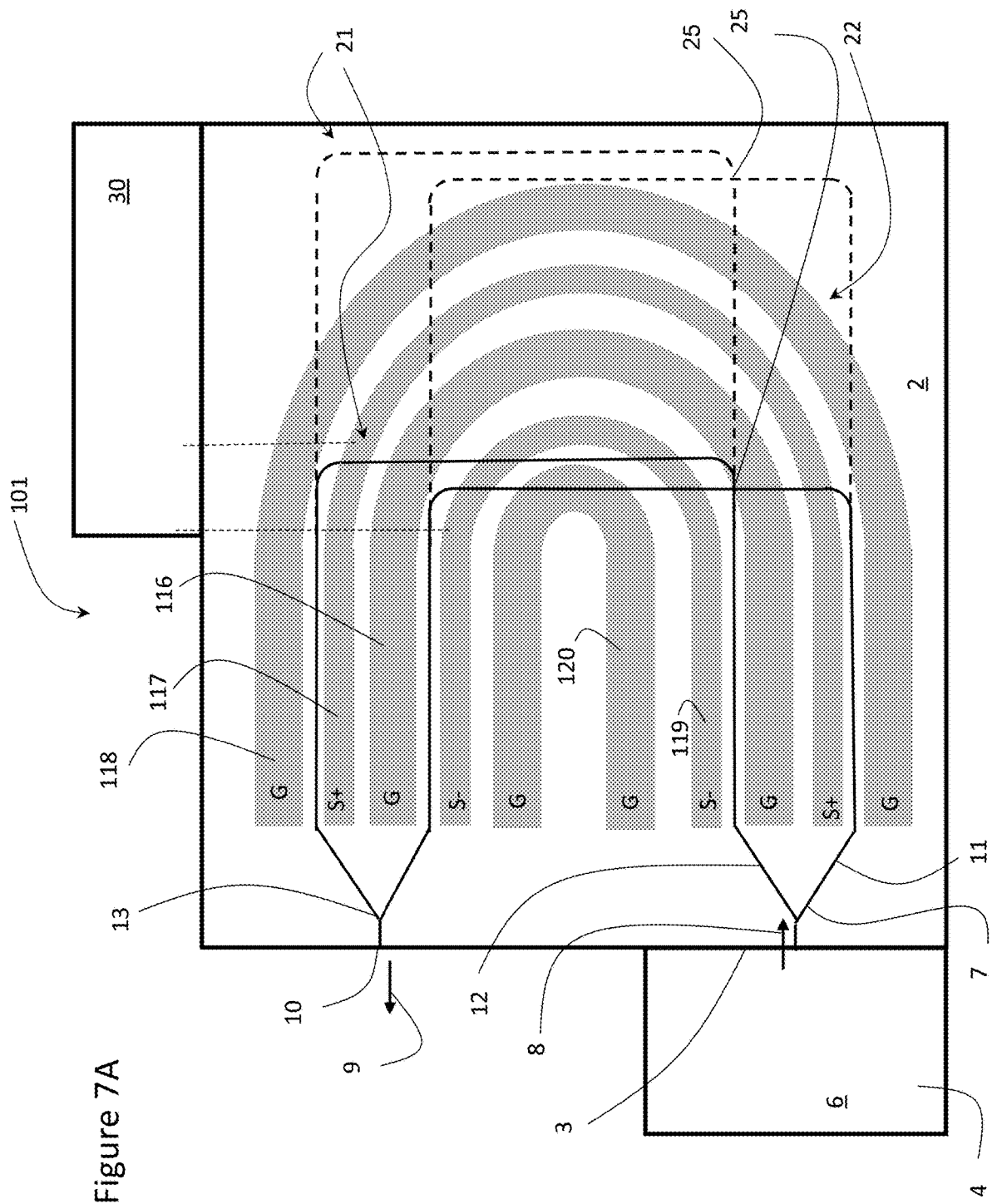
FIG. 7A is a top view of a single bend for a dual-drive electro-optic device in accordance with an embodiment of the present invention including five electrodes in which crossing enables the electrode gaps to be switched.

FIG. 7A illustrates a dual drive electro-optic modulator 101 for x-cut electro-optic first and second optical waveguides 11 and 12. A coplanar waveguide structure comprises five electrodes: i.e. a middle or first ground (G) 116, a first signal (S+) 117, an outer or second ground (G) 118, a second signal (S−) 119 with third and fourth straight sections, and an inner or third ground (G) 120 with fifth and sixth straight sections. For a z-cut crystal, the first and second optical waveguides 11 and 12 run directly underneath the first and second signal electrodes 117 and 119, respectively, rather than in between the signal and ground electrodes as shown in FIG. 3. The cross-sectional views of FIG. 7A may be similar to those of FIGS. 5A-5C, with additional electrodes, i.e. second signal electrode 119 and third ground electrode 120. The first and second signal electrodes 117 and 119 and the first, second and third ground electrodes 116, 118 and 120 may extend upwardly into a different level or layer of the upper cladding 15 and extend over top of the first and second optical waveguides 11 and 12, with a sufficiently thick (>1 um) layer of upper cladding 15 over the first and second optical waveguides 11 and 12 to ensure that the optical mode does experience absorption loss due to the electrodes 116 to 120, e.g. metals. Accordingly, the first and second optical waveguides 11 and 12, e.g. which form two arms of the Mach Zehnder modulator 1, may now directly run underneath the second bend section 22 of the electrodes 116 to 120. After the second bend section 22, the electrodes 116 to 120 may extend back down to the same layer, e.g. coplanar, as the first and second waveguides 11 and 12, for the second straight section, with the first and second optical waveguides 11 and 12 extending therebetween in interposed but opposite positions, e.g. the first optical waveguide 11 between the second signal electrode 119 and the first ground electrode 116, and the second waveguide 12 between the first signal electrode 117 and the second ground electrode 118. Accordingly, the direction of the electric field, which extends from the hot signal electrodes 117 and 119 to the ground electrodes 116, 118 and 120 is always in the same direction relative to an optical axis, e.g. extraordinary axis of the electro-optic crystal (+Z axis for LN), of for the first optical waveguide 11 even when the waveguide flips direction. If the direction of the electric field is not kept the same, then all the electro-optic phase shift accumulated before the first bend section 21 will be cancelled after the first bend section 21, resulting in no modulation of the input beam of light 8.

Figure 7B:
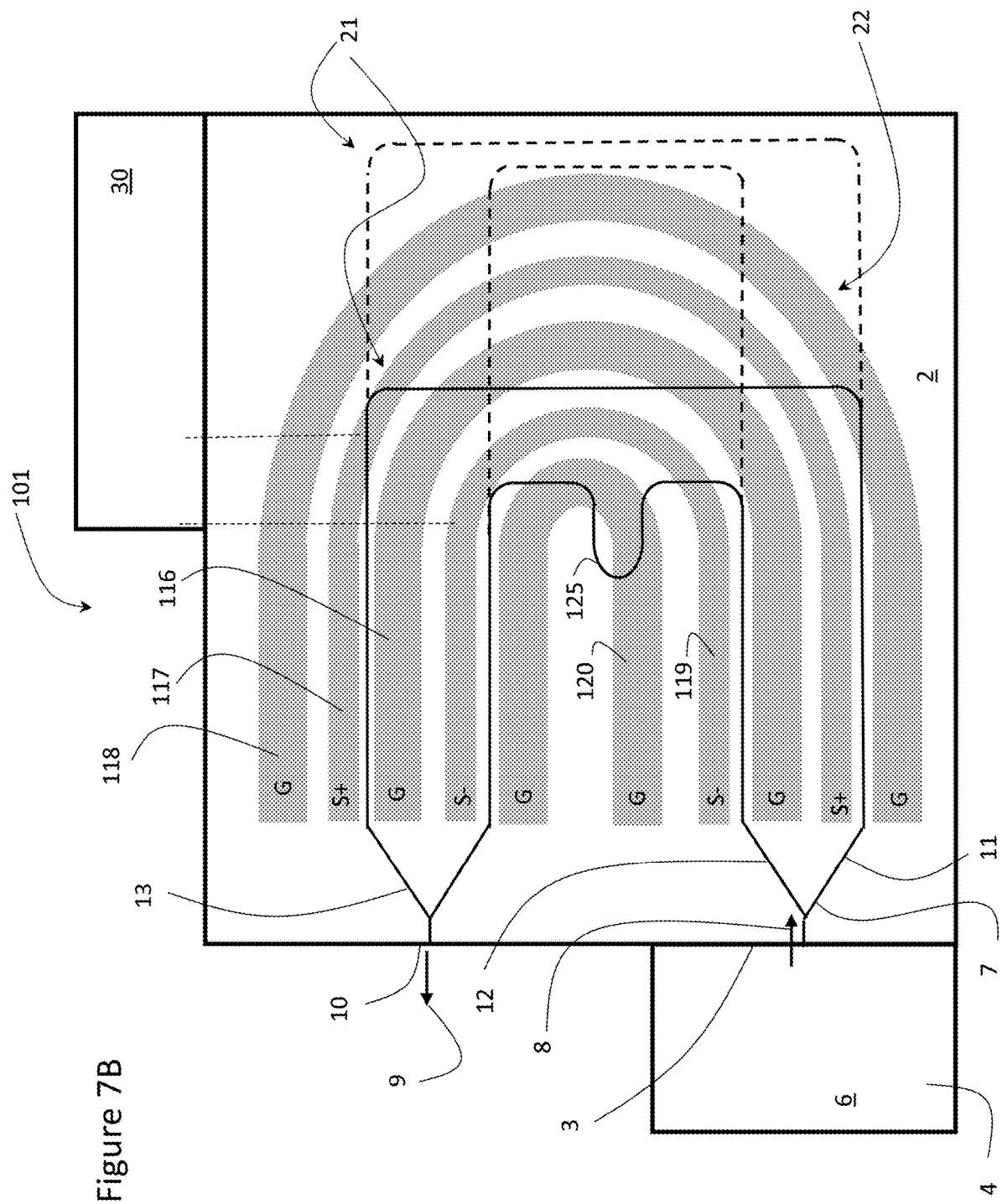
FIG. 7B is a top view of a single bend for a dual-drive electro-optic device in accordance with an embodiment of the present invention including five electrodes in which a crossing is not required to enable the electrode gaps to be switched.

With reference to FIG. 7B, in the dual (differential) drive configuration, an optical waveguide crossing 25 may not be required, if the electrode gaps are switched in the bend, e.g. the first waveguide 111 passes between the outer or second ground electrode 118 and the first signal electrode 117 during the first straight section, but then passes between the middle or first ground electrode 116 and the first signal electrode 117 during the second straight section. Similarly, the second waveguide 112 passes between the middle or first ground electrode 116 and the second hot electrode 119 during the first straight section, and then passes between the inner or third ground electrode 120 and the second hot electrode 119 during the second straight section. The first waveguide 111 may extend all the way around the first waveguide 111, and the second waveguide 112 may include a meandering structure, e.g. a U-shaped curve or bend 125 to equalize the optical lengths of the first and second waveguides 111 and 112.

Figure 8:
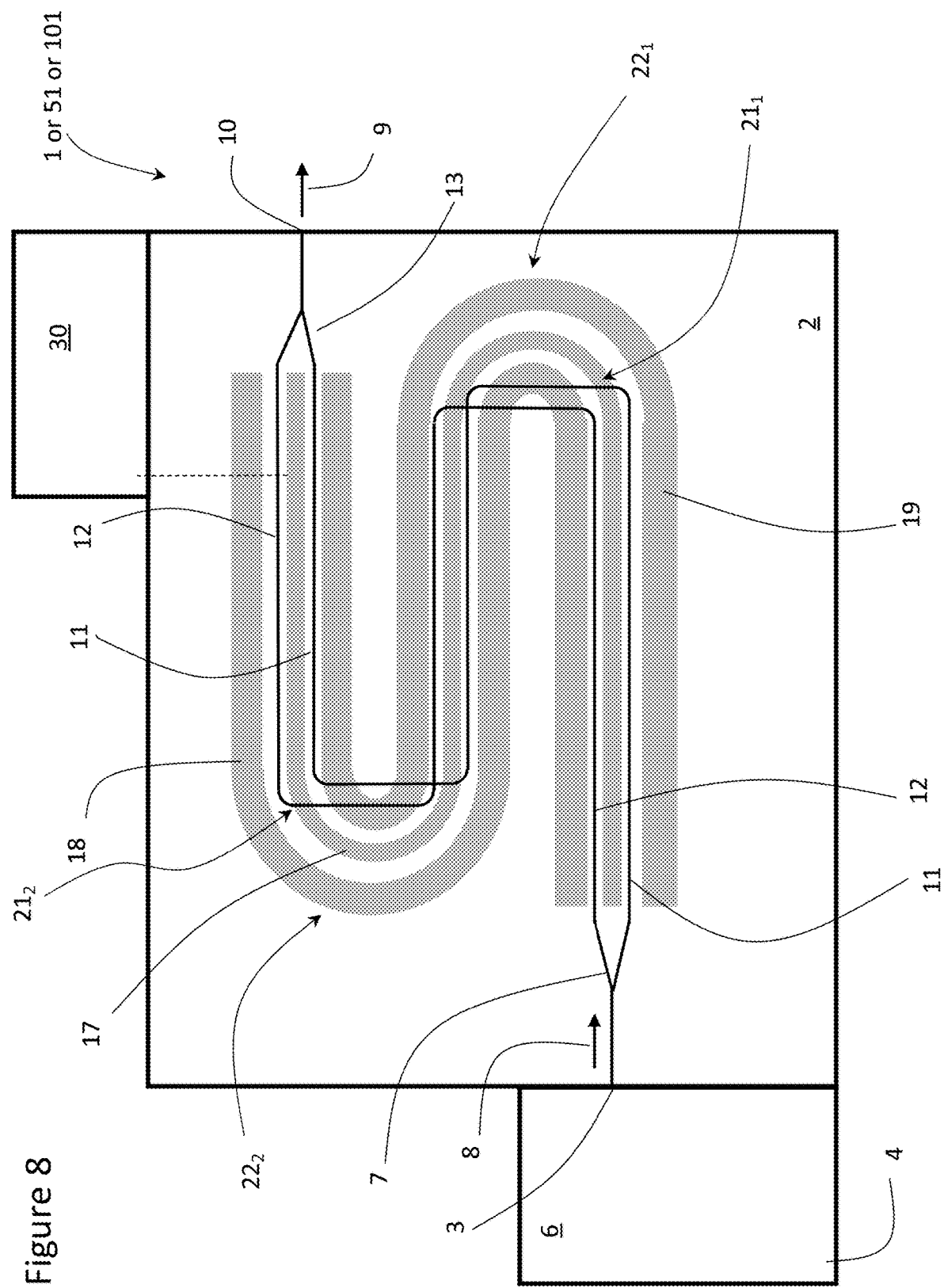
FIG. 8 is a top view of a two bend electro-optic device in accordance with another embodiment of the present invention.
Figure 9:
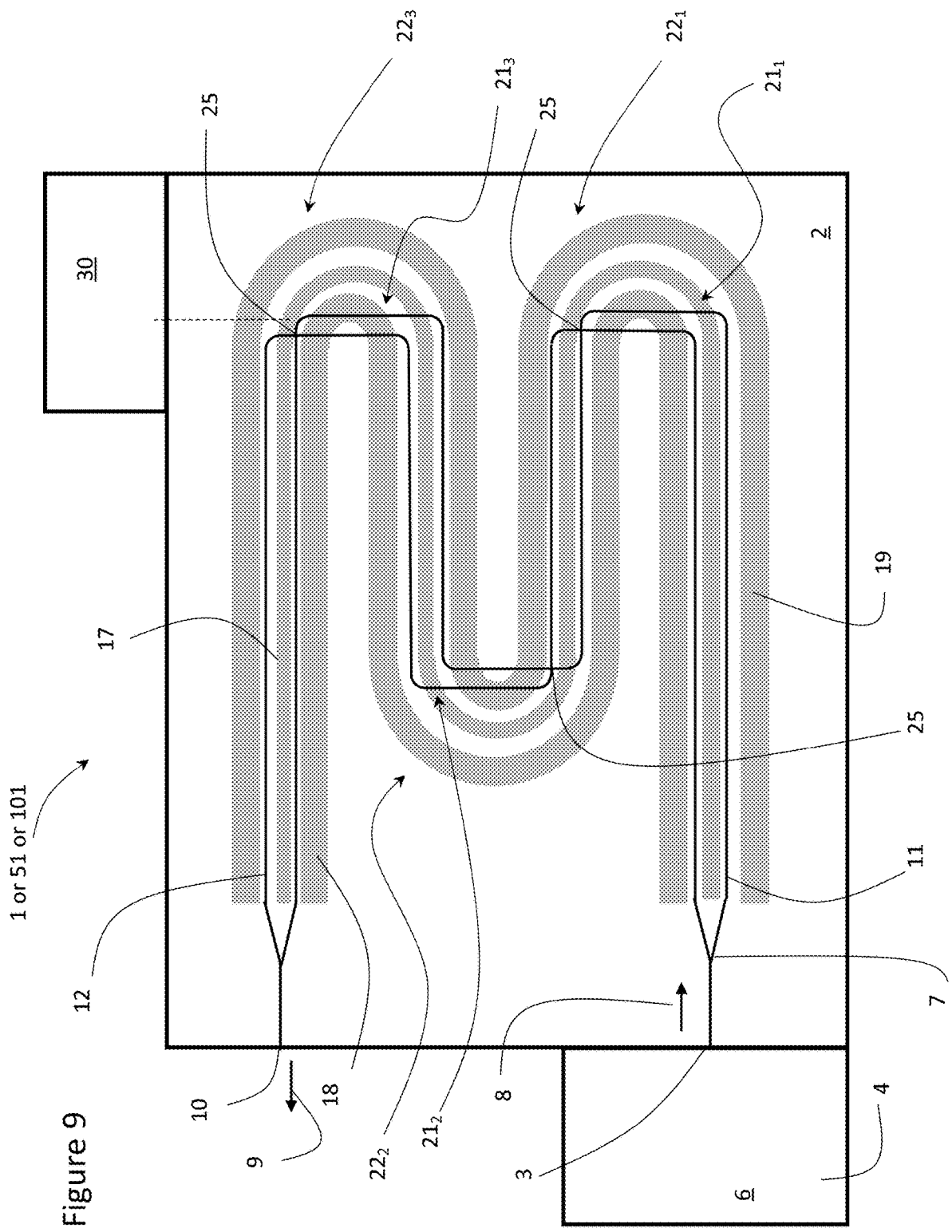
FIG. 9 is a top view of a three bend electro-optic device in accordance with another embodiment of the present invention.

With reference to FIGS. 8 and 9, the number of first bend sections $21_1$ to $21_n$, and the number of second bend sections $22_1$ to $22_n$, within a device 1 or 51 or 201 may vary based on the overall velocity mismatch between the optical signal and the electrical signal, and whether both the input port 3 and the output port 10 of the device 1 or 51 or 101, e.g. Mach-Zhender modulator, is required or desired on the same or opposite sides of the PIC chip 2. Each of the lengths of the first bend sections $21_1$ to $21_n$, may impose the same velocity mismatch or each of the first bend sections $21_1$ to $21_n$ may impose a different velocity mismatch relative to the second bend sections $22_1$ to $22_n$. FIG. 8 illustrates a device 1 or 51 or 101 in which the input port 3 is on an opposite side of the PIC chip 2 than the output port 10. FIG. 9 illustrates a device 1 or 51, which includes a plurality of first and second bend sections $21_1$ to $22_3$ and $22_1$ to $22_3$, and in which the input port 3 is on the same side of the PIC chip 2 as the output port 10.

Figure 10:
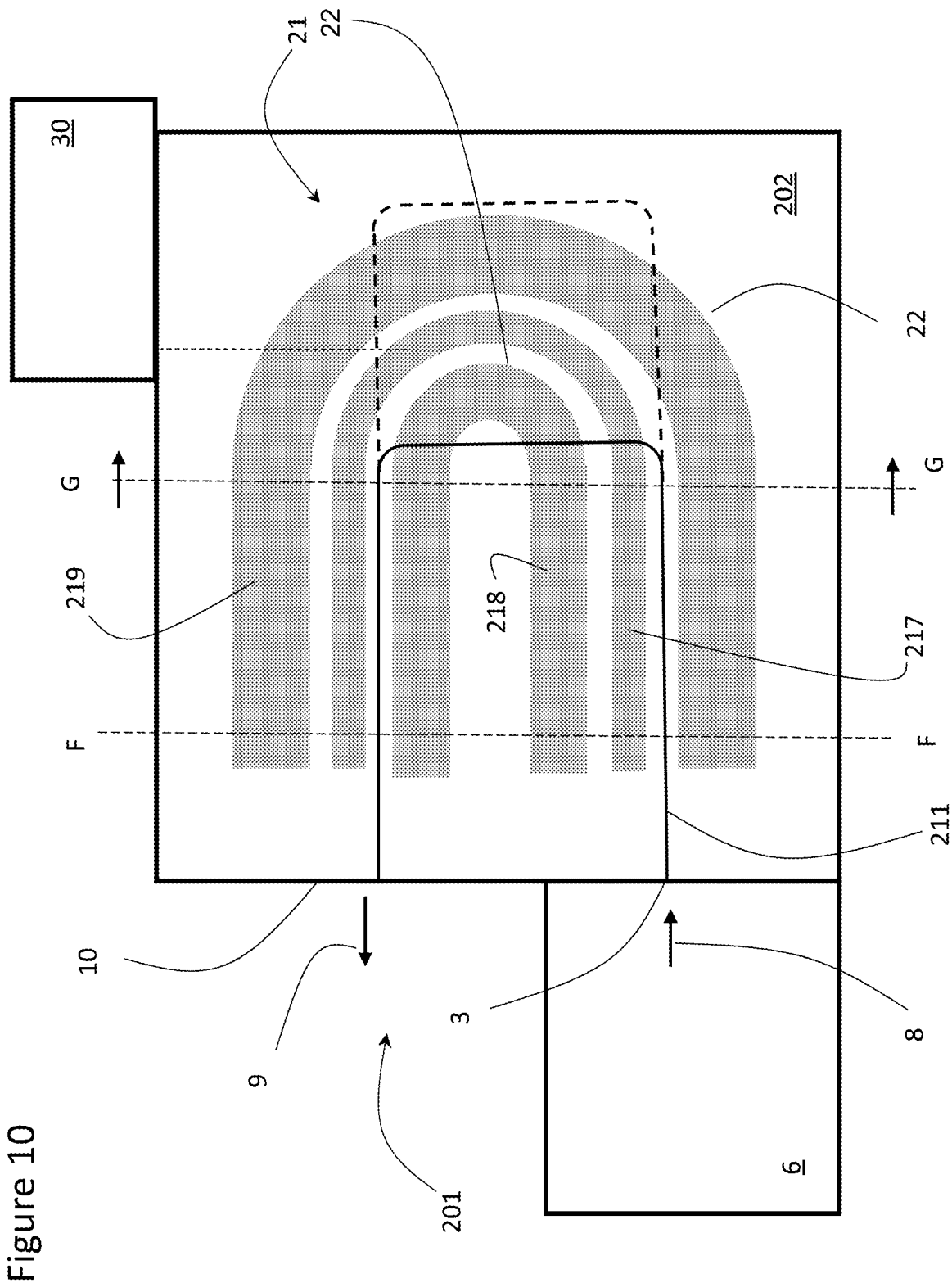
FIG. 10 is a top view of a single bend for an electro-optic device in accordance with an embodiment of the present invention in which a single waveguide is required.
Figure 11:
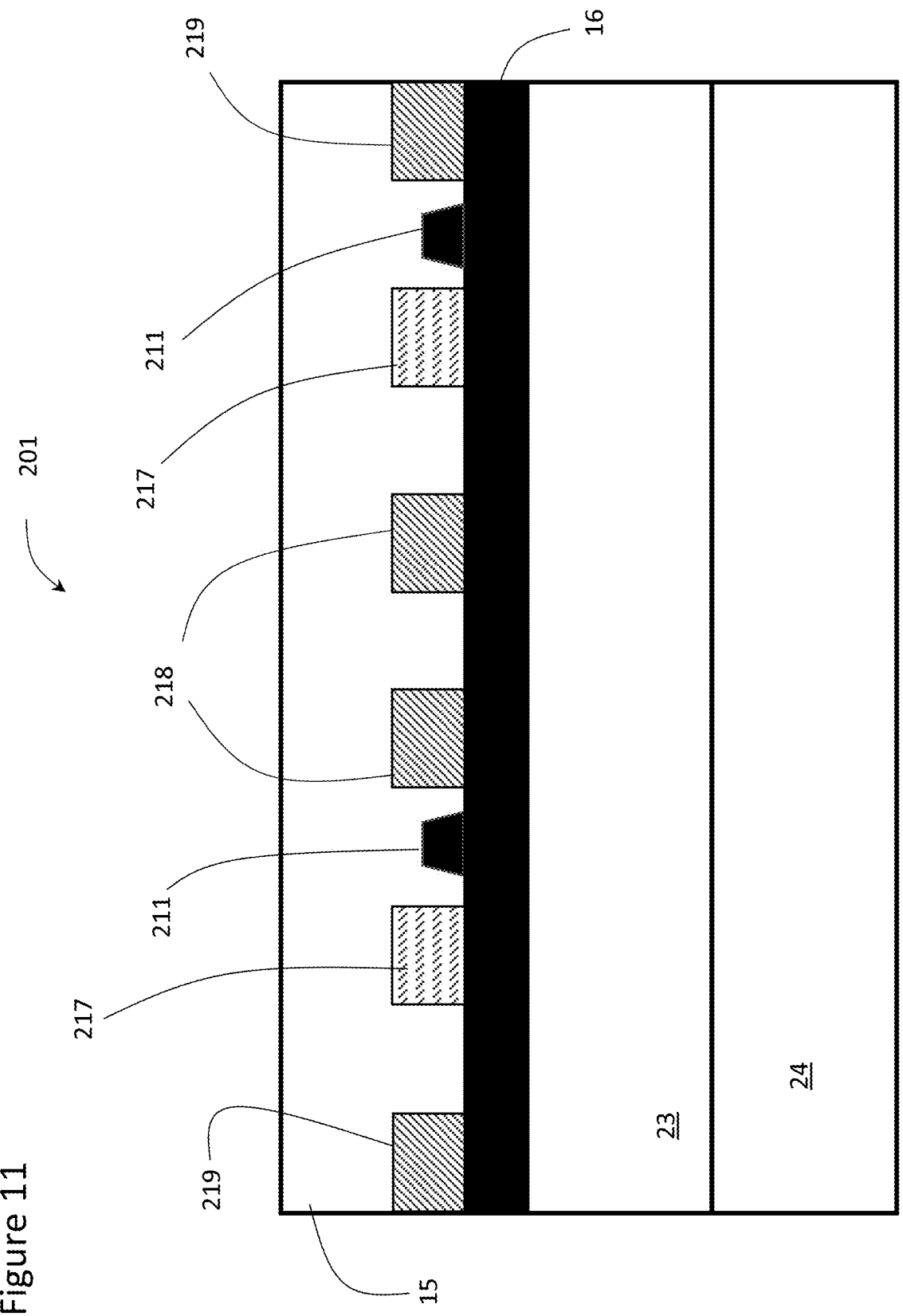
FIG. 11 is a cross-sectional view of the device of FIG. 10 taken along line F-F.
Figure 12:
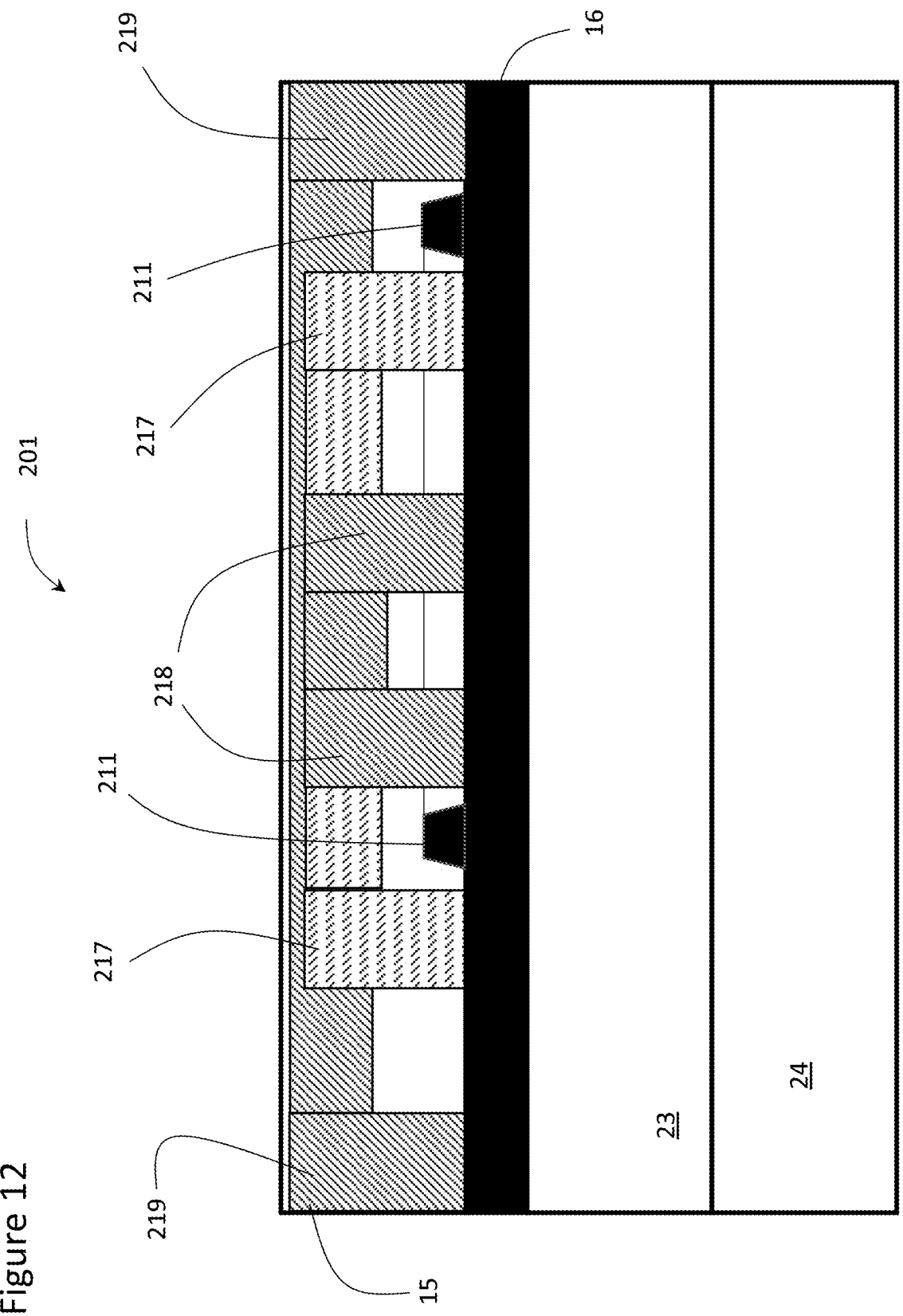
FIG. 12 is a cross-sectional view of the device of FIG. 10 taken along line G-G looking right with the cladding removed.

With reference to FIGS. 10 to 12, an electro-optic device 201, e.g. a phase modulator, may be provided on a photonic integrated circuit (PIC) chip 2, comprises an optical input port 3, which may be optically coupled to a continuous wave light source, such as a laser, or some other optical component, provided on the same PIC chip 2 or on a different PIC chip 6. An input beam of light 8, e.g. from the light source 4, propagates along a first waveguide 211, and is output the output port 10. The output beam 9 may undergo further processing, e.g. amplification, on the PIC chip 2 or optically coupled PICs, and then transmitted via suitable waveguides, e.g. optical fibers, to external destinations. Ideally, the first waveguide 211 is comprised of thin-film waveguides, and in particular thin-film lithium niobate waveguides, but other types of waveguides are within the scope of the invention. As above, with reference to FIGS. 8 and 9, the electro-optic device 201 may include a plurality of first and second bend sections 21 and 22.

Electrodes are provided for conveying an electrical, e.g. microwave-frequency, modulating signal from the external controller 30 to the first waveguide 211 configured for changing the index of refraction of the first waveguide 211, and thereby modulate the input beam of light 8 into the phase delayed output beam 9. In the illustrated example of FIGS. 10 to 12, which utilizes an X-cut electro-optic material for the first waveguide 211, a hot electrode 217 may be positioned on one side the first waveguide 211, while a first and a second ground electrode 218 and 219 are disposed on an opposite sides of the hot electrode 217 parallel therewith, with the first waveguide 211 disposed between the hot electrode 217 and one of the ground electrodes, e.g. the second ground electrode 219 along the first straight section and the first ground electrode 218 along the second straight section. Alternatively in a Z-cut electro-optic material the hot electrode 217 and is placed over the first waveguide 211. The first and second ground electrodes 218 and 219 may comprise other forms, e.g. the ground may be a plane that covers the entire PIC chip 202, as long as the gap between the hot electrode 217 and the ground is clear.

As above, by changing the optical path length, i.e. length of a first bend section 21, to be shorter (solid line) or longer (dashed line) than the effective path length for the microwave electrical modulating signal, i.e. the length of the second bend section 22, the velocity mismatch between the optical signal and the microwave electrical modulating signal may be compensated regardless of whether the optical or microwave velocity is faster. Accordingly, by adjusting the relative lengths of the first and second bend sections 21 and 22, e.g. by lengthening or shortening the first waveguide 211 to comprise a longer or a shorter length than the electrodes 217-219, any desired amount of compensation for the velocity mismatch may be incorporated, without changing the wafer geometry, changing the substrate materials, or depositing extra cladding materials.

With reference to FIGS. 11 and 12, in the first bend sections 22 (FIG. 12), one or more of the hot electrode 217 and the first and second ground electrodes 218 and 219 may extend upwardly, e.g. out of plane, away from adjacent the first waveguide 211 into a different level, plane or layer of the upper cladding 15 and extend over top of the first bend section 21 in the first waveguide 211, with a sufficiently thick (>1 um) layer of upper cladding 15 over the first waveguide 211 to ensure that the optical mode does not experience absorption loss due to the hot electrode 217, e.g. metals. Accordingly, the first waveguide 211 may now directly run underneath the second bend section 22 of the hot electrodes 217. After the second bend section 22, the hot electrode 217 extends back down to adjacent to, e.g. the same layer or coplanar, as the first waveguide 211, for the second straight section, with the first waveguide 211 extending between the hot electrode 217 and the other of ground electrodes than the first straight section, e.g. the first ground electrode 218. Accordingly, the direction of the electric field, which extends from the hot signal electrode 217 to the first and second ground electrodes 218 and 219 is always in the same direction relative to an optical axis, e.g. extraordinary axis of the electro-optic crystal (+Z axis for LN), of the first optical waveguide 211 even when the waveguide flips direction.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An electro-optic device comprising:
   a first waveguide, a first optical signal propagating in the first waveguide having an optical signal velocity, the first waveguide including lithium; and
   a first electrode, the first electrode carrying an electrical signal having an electrical signal velocity different from the optical signal velocity;
   wherein the first waveguide has a first length, and the first electrode has a second length, the first length and the second length having a difference in length, the difference in length at least partially compensating for a mismatch between the electrical signal velocity and the optical signal velocity; and
   wherein the first waveguide crosses a second waveguide at an intersection, the first waveguide and the second waveguide being configured such that crosstalk between the first waveguide and the second waveguide for the intersection is less than negative fifty dB.

2. The electro-optic device of claim 1, wherein the first waveguide includes a first straight waveguide section and a first bend waveguide section;
   wherein the first electrode includes a first straight electrode section and a first bend electrode section; and
   wherein the first bend waveguide section has a first bend length, and the first bend electrode section has a second bend length, the first bend length and the second bend length having at least a portion of the difference in length.

3. The electro-optic device of claim 2, further comprising:
   a first splitter for splitting an input optical signal into the first optical signal and a second optical signal; and
   wherein the second waveguide includes a second straight waveguide section and a second bend waveguide section configured to propagate the second optical signal at the optical signal velocity.

4. The electro-optic device of claim 3, further wherein the intersection is at the first bend waveguide section and the second bend waveguide section such that an electric field extending from the first electrode is in a same direction relative to an optical axis of the first waveguide along both the first straight waveguide section and the second straight waveguide section.

5. The electro-optic device of claim 3, wherein the first bend waveguide section includes a first bend radius;
   wherein the second bend waveguide section includes a second bend radius; and
   wherein the first bend radius is different than the second bend radius such that a first optical path length of the first waveguide is equalized with a second optical path length of the second waveguide.

6. The electro-optic device of claim 2, wherein the intersection includes a first expanding section for expanding a first width of the first waveguide, a first straight intersection section for intersecting the second waveguide, and a first tapering section for tapering the first width of the first waveguide; and
   a second expanding section for expanding a second width of the second waveguide, a second straight intersection section for intersecting the first waveguide, and a second tapering section for tapering the second width of the second waveguide.

7. The electro-optic device of claim 6, wherein the first expanding section expands the first width of the first waveguide by a factor of at least 1.2 and not more than 4.

8. The electro-optic device of claim 2, wherein the first waveguide has a first direction of transmission of the first optical signal in the intersection, the second waveguide has a second direction of transmission of a second optical signal in the intersection; and
   wherein the first direction is perpendicular to the second direction.

9. The electro-optic device of claim 1, wherein the first waveguide crosses the second waveguide at the intersection, the first waveguide and the second waveguide being configured such that an insertion loss for the first optical signal in the intersection is less than 0.1 dB.

10. An electro-optic device comprising:
    a first splitter for splitting a waveguide into a first waveguide and a second waveguide, the waveguide receiving an input optical signal, the first waveguide transmitting a first optical signal, the second waveguide transmitting a second optical signal;
    the first waveguide including a first straight waveguide section and a first bend waveguide section having a first bend radius, the first optical signal propagating in the first waveguide having an optical signal velocity, the first waveguide including lithium;
    a first electrode including a first straight electrode section and a first bend electrode section, the first electrode carrying an electrical signal having an electrical signal velocity different from the optical signal velocity; and
    the second waveguide including a second straight waveguide section and a second bend waveguide section configured to propagate the second optical signal at the optical signal velocity;

wherein the first waveguide has a first length, and the first electrode section has a second length, the first length and the second length having a difference in length, the difference in length compensating for a mismatch between the electrical signal velocity and the optical signal velocity;

wherein the second bend waveguide section includes a second bend radius, the first bend radius being different than the second bend radius such that a first optical path length of the first waveguide is equalized with a second optical path length of the second waveguide; and wherein the first waveguide and the second waveguide cross at an intersection and are configured such that crosstalk between the first waveguide and the second waveguide for the intersection is less than negative fifty dB.

11. The electro-optic device of claim 10, wherein the first waveguide and the second waveguide are configured such that an insertion loss for the first optical signal in the intersection is less than 0.1 dB.

12. A method comprising:

providing a first optical signal to a first waveguide, the first optical signal propagating in the first waveguide having an optical signal velocity, the first waveguide including lithium; and driving an electrical signal through a first electrode the first electrode carrying the electrical signal, the electrical signal having an electrical signal velocity different from the optical signal velocity;

wherein the first waveguide has a first length, and the first electrode has a second length, the first length and the second length having a difference in length, the difference in length compensating for a mismatch between the electrical signal velocity and the optical signal velocity; and the first waveguide crosses a second waveguide at an intersection, the first waveguide and the second waveguide being configured such that crosstalk between the first waveguide and the second waveguide for the intersection is less than negative fifty dB.

13. The method of claim 12, wherein the first waveguide includes a first straight waveguide section and a first bend waveguide section; and wherein the first electrode includes a first straight electrode section and a first bend electrode section;

wherein the first bend waveguide section has a first bend length, and the first bend electrode section has a second bend length, the first bend length and the second bend length having at least a portion of the difference in length.

14. The method of claim 13, wherein the providing the first optical signal includes providing an optical signal to a first splitter, the first splitter for splitting the optical signal into the first optical signal and a second optical signal; and wherein the second waveguide includes a third straight waveguide section, a second bend waveguide section, and a fourth straight waveguide section configured to propagate the second optical signal at the optical signal velocity.

15. The method of claim 13, wherein the intersection includes a first expanding section for expanding a first width of the first waveguide, a first straight intersection section for intersecting the second waveguide, and a first tapering section for tapering the first width of the first waveguide; and a second expanding section for expanding a second width of the second waveguide, a second straight intersection section for intersecting the first waveguide, and a second tapering section for tapering the second width of the second waveguide.

16. The method of claim 13, wherein the first bend waveguide section includes a first bend radius and the second waveguide includes a second bend waveguide section having a second bend radius; and wherein the first bend radius is different than the second bend radius such that a first optical path length of the first waveguide is equalized with a second optical path length of the second waveguide.

17. The method of claim 12, wherein the first waveguide crosses the second waveguide at the intersection, the first waveguide and the second waveguide being configured such that an insertion loss for the first optical signal in the intersection is less than 0.1 dB.

* * * * *